US011800221B2

(12) United States Patent
Yang et al.

(10) Patent No.: US 11,800,221 B2
(45) Date of Patent: Oct. 24, 2023

(54) TIME-LAPSE SHOOTING METHOD AND DEVICE

(71) Applicant: Huawei Technologies Co., Ltd., Guangdong (CN)

(72) Inventors: Fasheng Yang, Beijing (CN); Yihua Zeng, Shenzhen (CN); Shuncai Zhong, Shenzhen (CN); Jiale Bo, Shenzhen (CN); Huanwen Peng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/761,324

(22) PCT Filed: Sep. 10, 2020

(86) PCT No.: PCT/CN2020/114366
§ 371 (c)(1),
(2) Date: Mar. 17, 2022

(87) PCT Pub. No.: WO2021/052232
PCT Pub. Date: Mar. 25, 2021

(65) Prior Publication Data
US 2022/0247929 A1 Aug. 4, 2022

(30) Foreign Application Priority Data
Sep. 18, 2019 (CN) .......................... 201910882871.3

(51) Int. Cl.
*H04N 23/667* (2023.01)
*H04N 23/62* (2023.01)
*H04N 23/73* (2023.01)

(52) U.S. Cl.
CPC .......... *H04N 23/667* (2023.01); *H04N 23/62* (2023.01); *H04N 23/73* (2023.01)

(58) Field of Classification Search
CPC ...... H04N 23/667; H04N 23/62; H04N 23/73; H04N 23/631; H04N 23/632;
(Continued)

(56) References Cited

U.S. PATENT DOCUMENTS

2014/0298062 A1* 10/2014 Lee ....................... G06F 1/1626
713/323
2016/0344927 A1 11/2016 Brasket et al.
(Continued)

FOREIGN PATENT DOCUMENTS

CN   104349060 A   2/2015
CN   104811607 A   7/2015
(Continued)

OTHER PUBLICATIONS

ITU-T H.264 (Jun. 2019), Series H: Audiovisual and Multimedia Systems, Infrastructure of audiovisual services—Coding of moving video, Advanced video coding for generic audiovisual services, total 836 pages.

*Primary Examiner* — Ahmed A Berhan
(74) *Attorney, Agent, or Firm* — WOMBLE BOND DICKINSON (US) LLP

(57) ABSTRACT

Embodiments of this application provide a time-lapse shooting method and a device, and relate to the field of shooting technologies. Therefore, a shooting scenario may be automatically identified, a plurality of photos with a relatively good effect are obtained through shooting based on a target shooting parameter that matches the shooting scenario, and video coding is performed on the plurality of photos to generate a time-lapse video with a relatively good effect.

20 Claims, 28 Drawing Sheets

(58) Field of Classification Search
CPC ...... H04N 23/634; H04N 23/71; H04N 23/72; H04N 23/743; H04N 23/61
See application file for complete search history.

(56) References Cited

U.S. PATENT DOCUMENTS

| | | |
|---|---|---|
| 2017/0187954 A1 | 6/2017 | Fukuya et al. |
| 2017/0374254 A1* | 12/2017 | Miyazaki ............... H04N 23/73 |
| 2018/0234604 A1 | 8/2018 | Ramsay |
| 2019/0098196 A1* | 3/2019 | Bessou ................. H04N 23/71 |
| 2019/0208142 A1* | 7/2019 | Kitaya .................. H04N 23/63 |
| 2019/0260924 A1 | 8/2019 | Sudo |

FOREIGN PATENT DOCUMENTS

| | | |
|---|---|---|
| CN | 104822015 A | 8/2015 |
| CN | 105323527 A | 2/2016 |
| CN | 106506950 A | 3/2017 |
| CN | 109040609 A | 12/2018 |
| CN | 109068067 A | 12/2018 |
| CN | 109688331 A | 4/2019 |
| CN | 109743508 A | 5/2019 |
| CN | 110035141 A | 7/2019 |
| CN | 110086985 A | 8/2019 |
| CN | 110166703 A | 8/2019 |
| JP | 2015139025 A | 7/2015 |

* cited by examiner

Brightness value=132
FIG. 10A-(a)
Brightness value=121
FIG. 10A-(b)
Brightness value=129
FIG. 10A-(c)
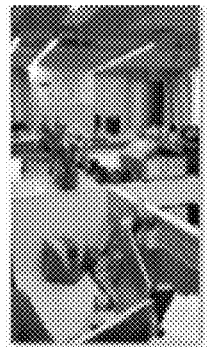
Brightness value=125
FIG. 10A-(d)
Brightness value=129
FIG. 10A-(e)
Brightness value=124
FIG. 10A-(f)

Brightness value=120
FIG. 10B-(a)
Brightness value=121
FIG. 10B-(b)
Brightness value=121
FIG. 10B-(c)
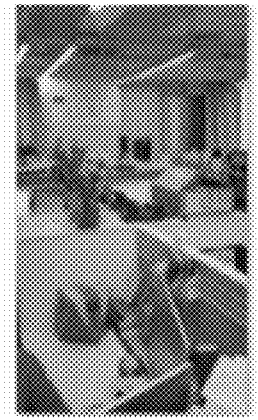
Brightness value=120
FIG. 10B-(d)
Brightness value=120
FIG. 10B-(e)
Brightness value=120
FIG. 10B-(f)

TIME-LAPSE SHOOTING METHOD AND DEVICE

CROSS-REFERENCE TO RELATED APPLICATIONS

This application is a national stage of International Application No. PCT/CN2020/114366, filed on Sep. 10, 2020, which claims priority to Chinese Patent Application No. 201910882871.3, filed on Sep. 18, 2019. Both of the aforementioned applications are hereby incorporated by reference in their entireties.

TECHNICAL FIELD

This application relates to the field of camera shooting technologies, and in particular, to a time-lapse shooting method and a device.

BACKGROUND

With development of electronic technologies, camera shooting functions of an electronic device such as a mobile phone or a tablet also increase. For example, the electronic device may have a plurality of video shooting functions such as time-lapse, slow motion, or fast motion. Time-lapse may be used to shoot a plurality of scenarios such as a building and manufacturing scenario, an urban scenery scenario, a natural scenery scenario, an astronomical phenomena scenario, an urban life scenario, or a biological evolution scenario.

In the conventional technology, in time-lapse, frame extraction processing may be performed on a shot video to compress content shot within a relatively long time into content of a relatively short time, and the content is played in a video manner. In the conventional technology, the electronic device has a relatively poor time-lapse shooting effect, and user experience is relatively poor.

SUMMARY

Embodiments of this application provide a time-lapse shooting method and a device. Therefore, a shooting scenario may be automatically identified, a plurality of photos with a relatively good effect are obtained through shooting based on a target shooting parameter that matches the shooting scenario, and video coding is performed on the plurality of photos to generate a time-lapse video with a relatively good effect. This implements relatively good user experience.

To achieve the foregoing objective, the following technical solutions are used in the embodiments of this application.

According to one aspect, an embodiment of this application provides a time-lapse shooting method. The method includes: after detecting a first operation that a user indicates to open a camera, an electronic device starts the camera. After detecting a second operation that the user indicates to enter a time-lapse mode, the electronic device enters the time-lapse mode, and displays a preview interface, where the preview interface includes a first preview image. The electronic device identifies a shooting scenario based on the first preview image, where the shooting scenario includes a high dynamic scenario, a low-light scenario, or a common scenario. The electronic device determines a target shooting parameter based on the shooting scenario, where the target shooting parameter includes a target photosensitivity (also referred to herein as ISO, from the International Organization for Standardization) and a target exposure time parameter. After detecting a third operation that the user indicates to start shooting, the electronic device obtains a plurality of target photos through shooting based on the target shooting parameter. In addition, the electronic device displays a shooting interface after detecting the third operation that the user indicates to start shooting. After detecting a fourth operation that the user indicates to stop shooting, the electronic device generates a time-lapse video based on the plurality of target photos.

In some embodiments, in the time-lapse mode, the electronic device may automatically detect a current shooting scenario; determine a target shooting parameter that matches the current shooting scenario, to obtain a plurality of photos with a relatively good effect through shooting based on the target shooting parameter; and perform video coding on the plurality of photos to generate a time-lapse video. Therefore, time-lapse shooting can be performed adaptively in different shooting scenarios, so that an effect of a time-lapse video obtained through shooting is relatively good.

In some embodiments, after the electronic device identifies the shooting scenario based on the first preview image, the method further includes: The electronic device displays first prompt information on the preview interface, where the first prompt information is used to prompt the shooting scenario identified by the electronic device.

In other words, after identifying the shooting scenario, the electronic device may prompt the user with a scenario type.

In some embodiments, after the electronic device enters the time-lapse mode, and displays the preview interface, where the preview interface includes the first preview image, the method further includes: The electronic device determines a target shooting interval based on a shot object on the first preview image. That the electronic device obtains a plurality of target photos through shooting based on the target shooting parameter includes: The electronic device obtains the plurality of target photos through shooting based on the target shooting parameter and the target shooting interval.

In some embodiments, in the time-lapse mode, the electronic device may obtain a plurality of target photos with a relatively good effect through shooting based on a target shooting interval and a target shooting parameter that match a shot object, so as to generate a time-lapse video with a relatively good effect.

In some embodiments, if the electronic device identifies that the shooting scenario is the high dynamic scenario, the target shooting parameter corresponding to the high dynamic scenario includes a plurality of exposure time parameters. That the electronic device obtains the plurality of target photos through shooting based on the target shooting parameter and the target shooting interval includes: The electronic device obtains one group of multi-frame images with different exposure degrees through shooting based on the plurality of exposure time parameters; the electronic device obtains a plurality of groups of images through shooting based on the target shooting interval; and the electronic device fuses each group of multi-frame images into one target photo.

In some embodiments, in the high dynamic scenario, the electronic device may fuse multi-frame images with different exposure degrees into one target photo with a larger dynamic range and a better effect by using a high dynamic algorithm.

In some embodiments, the first preview image is an image collected based on a first frame rate and a first shooting parameter; and after the electronic device detects the third operation that the user indicates to start time-lapse video shooting, the method further includes: If the electronic device identifies that the shooting scenario is the high dynamic scenario or the common scenario, the electronic device collects a display image based on the first frame rate and the first shooting parameter, where the shooting interface includes the display image.

In other words, if the electronic device identifies that the shooting scenario is the high dynamic scenario or the common scenario, the electronic device may collect an image by using a frame rate and an exposure parameter that are consistent with those in a preview state, and display the image on the shooting interface, so as to display a smooth image picture to the user in real time.

In some embodiments, the shooting interface further includes a first time control and a second time control, the first time control is used to indicate shooting duration of the time-lapse video, and the second time control is used to indicate playable duration of the time-lapse video.

In this way, the electronic device may prompt the user with the shooting duration and the playable duration on the shooting interface.

In some embodiments, the first preview image is an image collected based on a first frame rate and a first shooting parameter, and the first shooting parameter includes a first photosensitivity ISO and a first exposure time parameter. If the electronic device identifies that the shooting scenario is the low-light scenario, after the electronic device determines the target shooting parameter based on the shooting scenario and before the electronic device detects the third operation that the user indicates to start time-lapse video shooting, the method further includes: The electronic device collects a target image based on the target shooting parameter and a second frame rate, where the preview interface includes a second preview image, and the second preview image is the target image. The second frame rate is less than the first frame rate, the target photosensitivity ISO corresponding to the low-light scenario is less than the first photosensitivity ISO, and the target exposure time parameter corresponding to the low-light scenario is greater than the first exposure time parameter.

In other words, in the preview state, if the electronic device identifies that the shooting scenario is the low-light scenario, a frame rate may be reduced (in other words, the second frame rate less than a preview frame rate is used), and a larger exposure time parameter and a smaller ISO are used to collect the preview image, so as to display an image picture with a relatively good effect to the user when light is relatively dark.

In some embodiments, if the electronic device identifies that the shooting scenario is the low-light scenario, that the electronic device obtains the plurality of target photos through shooting based on the target shooting parameter and the target shooting interval includes: If the electronic device identifies that the shooting scenario is a starry-sky scenario in the low-light scenario, the electronic device determines the target shooting parameter and the target shooting interval corresponding to the starry-sky scenario; and the electronic device obtains the plurality of target photos through shooting based on the target shooting parameter and the target shooting interval corresponding to the starry-sky scenario; or if the electronic device identifies that the shooting scenario is not the starry-sky scenario, the electronic device obtains the plurality of target photos through shooting based on the target shooting parameter and the target shooting interval corresponding to the low-light scenario.

In this way, after the user indicates to start shooting, the electronic device may identify whether the current low-light scenario is the starry-sky scenario; and if the current low-light scenario is the starry-sky scenario, obtain the target photo through shooting based on the target shooting parameter that matches the starry-sky scenario; or if the current low-light scenario is not the starry-sky scenario, obtain the target photo through shooting based on the target shooting parameter that matches the low-light scenario.

In some embodiments, after the electronic device obtains the plurality of target photos through shooting based on the target shooting parameter and the target shooting interval corresponding to the starry-sky scenario, the method further includes: The electronic device performs image enhancement on the plurality of target photos.

Because light in a starry-sky shooting environment is usually relatively dark, a starry-sky image obtained by using a low ISO and long exposure still include a small amount of noise, and color and contrast effects may not be very good. Therefore, a mobile phone may perform image enhancement processing such as image denoising and brightness improvement on the target photo, so as to improve aesthetic feeling of the starry-sky image.

In some embodiments, if the electronic device identifies that the shooting scenario is the low-light scenario, after the electronic device detects the third operation that the user indicates to start time-lapse video shooting, the method further includes: The electronic device collects the target image based on the target shooting parameter corresponding to the low-light scenario and the second frame rate, where the shooting interface includes the target image. The shooting interface further includes second prompt information, and the second prompt information is used to prompt the user that the electronic device is performing optimization processing or the electronic device is identifying whether the shooting scenario is the starry-sky scenario.

In other words, if the electronic device identifies that the shooting scenario is the low-light scenario, after the electronic device just detects that the user indicates to start shooting, the electronic device may collect and display an image by using a relatively large exposure time parameter and a relatively small ISO in the target shooting parameter, so as to display an image picture with a relatively good effect to the user on the shooting interface when light is relatively dark. In addition, the electronic device may further display the second prompt information, so as to prevent the user from thinking that frame freezing or another problem occurs in the electronic device.

In some embodiments, after the electronic device displays the shooting interface, where the shooting interface includes the target image, the method further includes: If the electronic device identifies that the shooting scenario is the starry-sky scenario in the low-light scenario, the electronic device switches the target image on the shooting interface to the target photo obtained through shooting based on the target shooting parameter and the target shooting interval corresponding to the starry-sky scenario.

In other words, if the electronic device identifies that the shooting scenario is the starry-sky scenario, the electronic device may display the target photo on the shooting interface, so as to display an image picture with a relatively good effect to the user when environment light is very dark.

In some embodiments, if the electronic device identifies that the shooting scenario is the starry-sky scenario in the low-light scenario, or if the electronic device identifies that the shooting scenario is not the starry-sky scenario, the method further includes: The electronic device stops displaying the second prompt information on the shooting interface; and the electronic device displays a first time control and a second time control on the shooting interface, where the first time control is used to indicate shooting duration of the time-lapse video, and the second time control is used to indicate playable duration of the time-lapse video.

In other words, after determining whether the low-light scenario is the starry-sky scenario, the electronic device may start shooting to obtain the target photo in the starry-sky scenario, and may further start to display the shooting duration and the playable duration.

In some embodiments, the preview interface further includes a mode control, and the method further includes: The electronic device detects an operation that the user taps the mode control; the electronic device switches from an automatic mode to a manual mode; and the electronic device displays time-lapse parameter setting information on the preview interface in the manual mode.

In this way, the user may indicate to switch between the automatic mode and the manual mode, and may further set a time-lapse related parameter in the manual mode.

In some embodiments, when the instructions are executed by the electronic device, the electronic device is further enabled to perform the following operation: after obtaining the plurality of target photos through shooting based on the target shooting parameter, the electronic device performs inter-frame brightness smoothing processing on the plurality of target photos.

Therefore, the electronic device performs inter-frame brightness smoothing processing. This can reduce a brightness difference between adjacent target photos, ensure picture brightness smoothness and consistency, and avoid brightness jumping.

In some embodiments, that the electronic device identifies a shooting scenario based on the first preview image includes: The electronic device identifies the shooting scenario based on one or more of the first photosensitivity ISO, the first exposure time parameter, or a brightness distribution histogram corresponding to the first preview image.

In other words, the electronic device may identify a scenario type of the shooting scenario by using a parameter such as a photosensitivity ISO, an exposure time parameter, or a brightness distribution histogram.

In some embodiments, that the electronic device identifies the shooting scenario based on one or more of the first photosensitivity ISO, the first exposure time parameter, or a brightness distribution histogram corresponding to the first preview image includes: If the electronic device determines, based on the first photosensitivity ISO and the first exposure time parameter, that ambient light brightness is less than a first preset value, the electronic device determines that the shooting scenario is the low-light scenario; or if the electronic device determines, based on the first photosensitivity ISO and the first exposure time parameter, that ambient light brightness is greater than or equal to a first preset value, the electronic device determines that the shooting scenario is the high dynamic scenario or the common scenario; and if the electronic device determines, based on the brightness distribution histogram, that a preset condition is met, the electronic device determines that the shooting scenario is the high dynamic scenario, where the preset condition includes that a proportion of pixels whose brightness is within a first brightness range and a second brightness range on the first preview image is greater than or equal to a second preset value, the first brightness range is a low brightness range, and the second brightness range is a high brightness range; or if the electronic device determines, based on the brightness distribution histogram, that a preset condition is not met, the electronic device determines that the shooting scenario is the common scenario.

It may be understood that ambient light brightness is relatively small in the low-light scenario, ambient light brightness is relatively large in the common scenario, and a dynamic range of brightness in the high dynamic scenario is relatively large, including a shot object with low brightness and a shot object with high brightness.

In some embodiments, that the electronic device identifies that the shooting scenario is the starry-sky scenario in the low-light scenario includes: The electronic device collects a reference image by using the target shooting parameter corresponding to the low-light scenario; and if the electronic device determines that the target shooting parameter is within a preset parameter range, an exposure time parameter within the preset parameter range is greater than or equal to a third preset value, and the electronic device identifies that a shot object on the reference image includes a starry sky, the electronic device determines that the shooting scenario is the starry-sky scenario.

In other words, the electronic device may determine, based on the preset parameter range and the fact indicating whether the shot object includes the starry sky, whether the shooting scenario is the starry-sky scenario.

In some embodiments, that the electronic device determines the target shooting parameter corresponding to the starry-sky scenario includes: If an average brightness value of pixels on the reference image is within a third brightness range, and a percentage of pixels in the third brightness range is greater than or equal to 50%, the electronic device determines that a shooting parameter corresponding to the reference image is the target shooting parameter corresponding to the starry-sky scenario; or if an average brightness value of pixels on the reference image is not within a third brightness range, or a percentage of pixels in the third brightness range is less than 50%, the electronic device adjusts an exposure time parameter, and re-collects the reference image based on an adjusted exposure time parameter; and if the electronic device determines that duration of detecting the third operation is greater than or equal to preset duration, the electronic device stops collecting the reference image after adjusting the exposure time parameter, where the target shooting parameter includes the adjusted exposure time parameter.

In other words, the electronic device may determine, based on pixel brightness and a percentage of pixels in a preset brightness range, the target shooting parameter corresponding to the starry-sky scenario.

According to another aspect, an embodiment of this application provides a time-lapse shooting method. The method includes: after detecting a first operation that a user indicates to open a camera, an electronic device starts the camera. After detecting a second operation that the user indicates to enter a time-lapse mode, the electronic device enters the time-lapse mode, and displays a preview interface, where the preview interface includes a first preview image. After detecting a third operation that the user indicates to start time-lapse video shooting, the electronic device obtains a plurality of target photos through shooting. The electronic device displays a shooting interface. After detecting a fourth operation that the user indicates to stop time-lapse video shooting, the electronic device generates a time-lapse video based on the plurality of target photos.

In some embodiments, in the time-lapse mode, the electronic device may automatically obtain a plurality of photos with a relatively good effect through shooting based on a shooting algorithm, and perform video coding on the plurality of photos, so as to generate a time-lapse video with a relatively good effect. This implements relatively good user experience.

In some embodiments, after the electronic device enters the time-lapse mode, and displays the preview interface, where the preview interface includes the first preview image, the method further includes: The electronic device determines a target shooting interval based on a shot object on the first preview image. That the electronic device obtains a plurality of target photos through shooting includes: The electronic device obtains the plurality of target photos through shooting based on the target shooting interval.

In some embodiments, in the time-lapse mode, the electronic device may obtain a plurality of target photos with a relatively good effect through shooting based on a target shooting interval that matches a shot object, so as to generate a time-lapse video with a relatively good effect.

In some embodiments, after the electronic device enters the time-lapse mode, and displays the preview interface, where the preview interface includes the first preview image, the method further includes: The electronic device identifies a shooting scenario based on the first preview image, where the shooting scenario includes a high dynamic scenario, a low-light scenario, or a common scenario. That the electronic device obtains the plurality of target photos through shooting based on the target shooting interval includes: The electronic device obtains the plurality of target photos through shooting based on the shooting scenario and the target shooting interval.

In some embodiments, in the time-lapse mode, the electronic device may automatically detect a current shooting scenario; determine a target shooting interval that matches a shot object, to obtain a plurality of photos with a relatively good effect through shooting based on the shooting scenario and the target shooting interval; and perform video coding on the plurality of photos to generate a time-lapse video. Therefore, time-lapse shooting can be performed adaptively in different shooting scenarios, so that an effect of a time-lapse video obtained through shooting is relatively good.

In some embodiments, after the electronic device identifies the shooting scenario based on the first preview image, the method further includes: The electronic device determines a target shooting parameter based on the shooting scenario, where the target shooting parameter includes a target photosensitivity ISO and a target exposure time parameter. That the electronic device obtains the plurality of target photos through shooting based on the shooting scenario and the target shooting interval includes: The electronic device obtains the plurality of target photos through shooting based on the target shooting parameter and the target shooting interval.

In some embodiments, in the time-lapse mode, the electronic device may automatically detect a current shooting scenario; determine a target shooting parameter that matches the current shooting scenario and a target shooting interval that matches a shot object, to obtain a plurality of photos with a relatively good effect through shooting based on the target shooting parameter and the target shooting interval; and perform video coding on the plurality of photos to generate a time-lapse video. Therefore, time-lapse shooting can be performed adaptively in different shooting scenarios, so that an effect of a time-lapse video obtained through shooting is relatively good.

According to another aspect, an embodiment of this application provides a time-lapse shooting method. The method includes: after detecting a first operation that a user indicates to open a camera, an electronic device starts the camera. After detecting a second operation that the user indicates to enter a time-lapse mode, the electronic device enters the time-lapse mode, and displays a preview interface, where the preview interface includes a first preview image. The electronic device determines a target shooting interval based on a shot object on the first preview image. The electronic device identifies a shooting scenario based on the first preview image, where the shooting scenario includes a high dynamic scenario, a low-light scenario, or a common scenario. The electronic device determines a target shooting parameter based on the shooting scenario, where the target shooting parameter includes a target photosensitivity ISO and a target exposure time parameter. After detecting a third operation that the user indicates to start time-lapse video shooting, the electronic device obtains a plurality of target photos through shooting based on the target shooting parameter and the target shooting interval. The electronic device displays a shooting interface. After detecting a fourth operation that the user indicates to stop time-lapse video shooting, the electronic device generates a time-lapse video based on the plurality of target photos.

In some embodiments, in the time-lapse mode, the electronic device may automatically detect a current shooting scenario; determine a target shooting parameter that matches the current shooting scenario and a target shooting interval that matches a shot object, to obtain a plurality of photos with a relatively good effect through shooting based on the target shooting parameter and the target shooting interval; and perform video coding on the plurality of photos to generate a time-lapse video. Therefore, time-lapse shooting can be performed adaptively in different shooting scenarios, so that an effect of a time-lapse video obtained through shooting is relatively good.

According to another aspect, an embodiment of this application provides an electronic device. The electronic device includes: a camera, configured to collect an image; a screen, configured to display an interface; one or more processors; and one or more memories, where the memories store instructions. When the instructions are executed by the electronic device, the electronic device is enabled to perform the following operations: after detecting a first operation that a user indicates to open a camera, starting the camera; after detecting a second operation that the user indicates to enter a time-lapse mode, entering the time-lapse mode, and displaying a preview interface, where the preview interface includes a first preview image; identifying a shooting scenario based on the first preview image, where the shooting scenario includes a high dynamic scenario, a low-light scenario, or a common scenario; determining a target shooting parameter based on the shooting scenario, where the target shooting parameter includes a target photosensitivity ISO and a target exposure time parameter; after detecting a third operation that the user indicates to start shooting, obtaining a plurality of target photos through shooting based on the target shooting parameter; displaying a shooting interface; and after detecting a fourth operation that the user indicates to stop shooting, generating a time-lapse video based on the plurality of target photos.

In some embodiments, when the instructions are executed by the electronic device, the electronic device is further enabled to perform the following operations: after identifying the shooting scenario based on the first preview image, displaying first prompt information on the preview interface, where the first prompt information is used to prompt the shooting scenario identified by the electronic device.

In some embodiments, when the instructions are executed by the electronic device, the electronic device is further enabled to perform the following operation: after entering the time-lapse mode, and displaying the preview interface, where the preview interface includes the first preview image, determining a target shooting interval based on a shot object on the first preview image. The obtaining a plurality of target photos through shooting based on the target shooting parameter includes: obtaining the plurality of target photos through shooting based on the target shooting parameter and the target shooting interval.

In some embodiments, if the electronic device identifies that the shooting scenario is the high dynamic scenario, the target shooting parameter corresponding to the high dynamic scenario includes a plurality of exposure time parameters. The obtaining the plurality of target photos through shooting based on the target shooting parameter and the target shooting interval includes: obtaining one group of multi-frame images with different exposure degrees through shooting based on the plurality of exposure time parameters; obtaining a plurality of groups of images through shooting based on the target shooting interval; and fusing each group of multi-frame images into one target photo.

In some embodiments, the first preview image is an image collected based on a first frame rate and a first shooting parameter; and when the instructions are executed by the electronic device, the electronic device is further enabled to perform the following operation: after detecting the third operation that the user indicates to start time-lapse video shooting, if the electronic device identifies that the shooting scenario is the high dynamic scenario or the common scenario, collecting a display image based on the first frame rate and the first shooting parameter, where the shooting interface includes the display image.

In some embodiments, the shooting interface further includes a first time control and a second time control, the first time control is used to indicate shooting duration of the time-lapse video, and the second time control is used to indicate playable duration of the time-lapse video.

In some embodiments, the first preview image is an image collected based on a first frame rate and a first shooting parameter, and the first shooting parameter includes a first photosensitivity ISO and a first exposure time parameter. When the instructions are executed by the electronic device, the electronic device is further enabled to perform the following operation: if the electronic device identifies that the shooting scenario is the low-light scenario, after determining the target shooting parameter based on the shooting scenario and before detecting the third operation that the user indicates to start time-lapse video shooting, collecting a target image based on the target shooting parameter and a second frame rate, where the preview interface includes a second preview image, and the second preview image is the target image. The second frame rate is less than the first frame rate, the target photosensitivity ISO corresponding to the low-light scenario is less than the first photosensitivity ISO, and the target exposure time parameter corresponding to the low-light scenario is greater than the first exposure time parameter.

In some embodiments, if the electronic device identifies that the shooting scenario is the low-light scenario, the obtaining the plurality of target photos through shooting based on the target shooting parameter and the target shooting interval includes: if the electronic device identifies that the shooting scenario is a starry-sky scenario in the low-light scenario, determining the target shooting parameter and the target shooting interval corresponding to the starry-sky scenario; and obtaining the plurality of target photos through shooting based on the target shooting parameter and the target shooting interval corresponding to the starry-sky scenario; or if the electronic device identifies that the shooting scenario is not the starry-sky scenario, obtaining the plurality of target photos through shooting based on the target shooting parameter and the target shooting interval corresponding to the low-light scenario.

In some embodiments, when the instructions are executed by the electronic device, the electronic device is further enabled to perform the following operation: after obtaining the target photos through shooting based on the target shooting parameter and the target shooting interval corresponding to the starry-sky scenario, performing image enhancement on the target photos.

In some embodiments, when the instructions are executed by the electronic device, the electronic device is further enabled to perform the following operation: if the electronic device identifies that the shooting scenario is the low-light scenario, after detecting the third operation that the user indicates to start time-lapse video shooting, collecting the target image based on the target shooting parameter corresponding to the low-light scenario and the second frame rate, where the shooting interface includes the target image. The shooting interface further includes second prompt information, and the second prompt information is used to prompt the user that the electronic device is performing optimization processing or the electronic device is identifying whether the shooting scenario is the starry-sky scenario.

In some embodiments, when the instructions are executed by the electronic device, the electronic device is further enabled to perform the following operation: after displaying the shooting interface, where the shooting interface includes the target image, if the electronic device identifies that the shooting scenario is the starry-sky scenario in the low-light scenario, switching the target image on the shooting interface to the target photo obtained through shooting based on the target shooting parameter and the target shooting interval corresponding to the starry-sky scenario.

In some embodiments, when the instructions are executed by the electronic device, the electronic device is further enabled to perform the following operations: if the electronic device identifies that the shooting scenario is the starry-sky scenario in the low-light scenario, or if the electronic device identifies that the shooting scenario is not the starry-sky scenario, stopping displaying the second prompt information on the shooting interface; and displaying a first time control and a second time control on the shooting interface, where the first time control is used to indicate shooting duration of the time-lapse video, and the second time control is used to indicate playable duration of the time-lapse video.

In some embodiments, when the instructions are executed by the electronic device, the electronic device is further enabled to perform the following operation: after obtaining the plurality of target photos through shooting, performing inter-frame brightness smoothing processing on the plurality of target photos.

In some embodiments, the preview interface further includes a mode control, and when the instructions are executed by the electronic device, the electronic device is further enabled to perform the following operations: detecting an operation that the user taps the mode control; switching from an automatic mode to a manual mode; and displaying time-lapse parameter setting information on the preview interface in the manual mode.

In some embodiments, the identifying a shooting scenario based on the first preview image includes: identifying the shooting scenario based on one or more of the first photosensitivity ISO, the first exposure time parameter, or a brightness distribution histogram corresponding to the first preview image.

In some embodiments, the identifying the shooting scenario based on one or more of the first photosensitivity ISO, the first exposure time parameter, or a brightness distribution histogram corresponding to the first preview image includes: if the electronic device determines, based on the first photosensitivity ISO and the first exposure time parameter, that ambient light brightness is less than a first preset value, determining that the shooting scenario is the low-light scenario; or if the electronic device determines, based on the first photosensitivity ISO and the first exposure time parameter, that ambient light brightness is greater than or equal to a first preset value, determining that the shooting scenario is the high dynamic scenario or the common scenario; and if the electronic device determines, based on the brightness distribution histogram, that a preset condition is met, determining that the shooting scenario is the high dynamic scenario, where the preset condition includes that a proportion of pixels whose brightness is within a first brightness range and a second brightness range on the first preview image is greater than or equal to a second preset value, the first brightness range is a low brightness range, and the second brightness range is a high brightness range; or if the electronic device determines, based on the brightness distribution histogram, that a preset condition is not met, determining that the shooting scenario is the common scenario.

In some embodiments, the identifying that the shooting scenario is the starry-sky scenario in the low-light scenario includes: collecting a reference image by using the target shooting parameter corresponding to the low-light scenario; and if the electronic device determines that the target shooting parameter is within a preset parameter range, an exposure time parameter within the preset parameter range is greater than or equal to a third preset value, and the electronic device identifies that a shot object on the reference image includes a starry sky, determining that the shooting scenario is the starry-sky scenario.

In some embodiments, the determining the target shooting parameter corresponding to the starry-sky scenario includes: if an average brightness value of pixels on the reference image is within a third brightness range, and a percentage of pixels in the third brightness range is greater than or equal to 50%, determining that a shooting parameter corresponding to the reference image is the target shooting parameter corresponding to the starry-sky scenario; or if an average brightness value of pixels on the reference image is not within a third brightness range, or a percentage of pixels in the third brightness range is less than 50%, adjusting an exposure time parameter, and re-collecting the reference image based on an adjusted exposure time parameter; and if the electronic device determines that duration of detecting the third operation is greater than or equal to preset duration, stopping collecting the reference image after adjusting the exposure time parameter, where the target shooting parameter includes the adjusted exposure time parameter.

According to another aspect, an embodiment of this application provides a shooting apparatus. The apparatus is included in an electronic device. The apparatus has functions of implementing behavior of the electronic device in any method according to the foregoing aspects and the possible designs. The functions may be implemented by hardware, or may be implemented by hardware executing corresponding software. The hardware or the software includes at least one module or unit corresponding to the foregoing functions, for example, a detection module/unit, a display module/unit, a determining module/unit, a shooting module/unit, a processing module/unit, and a generation module/unit.

According to another aspect, an embodiment of this application provides a computer storage medium, including computer instructions. When the computer instructions are run on an electronic device, the electronic device is enabled to perform the time-lapse shooting method according to any possible design of the foregoing aspects.

According to still another aspect, an embodiment of this application provides a computer program product. When the computer program product runs on a computer, the computer is enabled to perform the time-lapse shooting method according to any possible design of the foregoing aspects.

According to another aspect, an embodiment of this application provides a chip system. The chip system is applied to an electronic device. The chip system includes one or more interface circuits and one or more processors. The interface circuit and the processor are connected through a line. The interface circuit is configured to: receive a signal from a memory of the electronic device, and send the signal to the processor. The signal includes computer instructions stored in the memory. When the processor executes the computer instructions, the electronic device performs the time-lapse shooting method according to any possible design of the foregoing aspects.

For beneficial effects corresponding to the foregoing other aspects, refer to the descriptions of the beneficial effects in the method aspects. Details are not described herein again.

BRIEF DESCRIPTION OF DRAWINGS

FIG. 3(a) to FIG. 3(c) are schematic diagrams of a group of interfaces according to an embodiment of this application;

FIG. 10A-(a) to FIG. 10A-(f) are diagrams of a brightness effect of a target photo generated before inter-frame brightness smoothing processing according to an embodiment of this application;

FIG. 10B-(a) to FIG. 10B-(f) are diagrams of a brightness effect of a target photo generated after inter-frame brightness smoothing processing according to an embodiment of this application;

DESCRIPTION OF EMBODIMENTS

Figure 1:
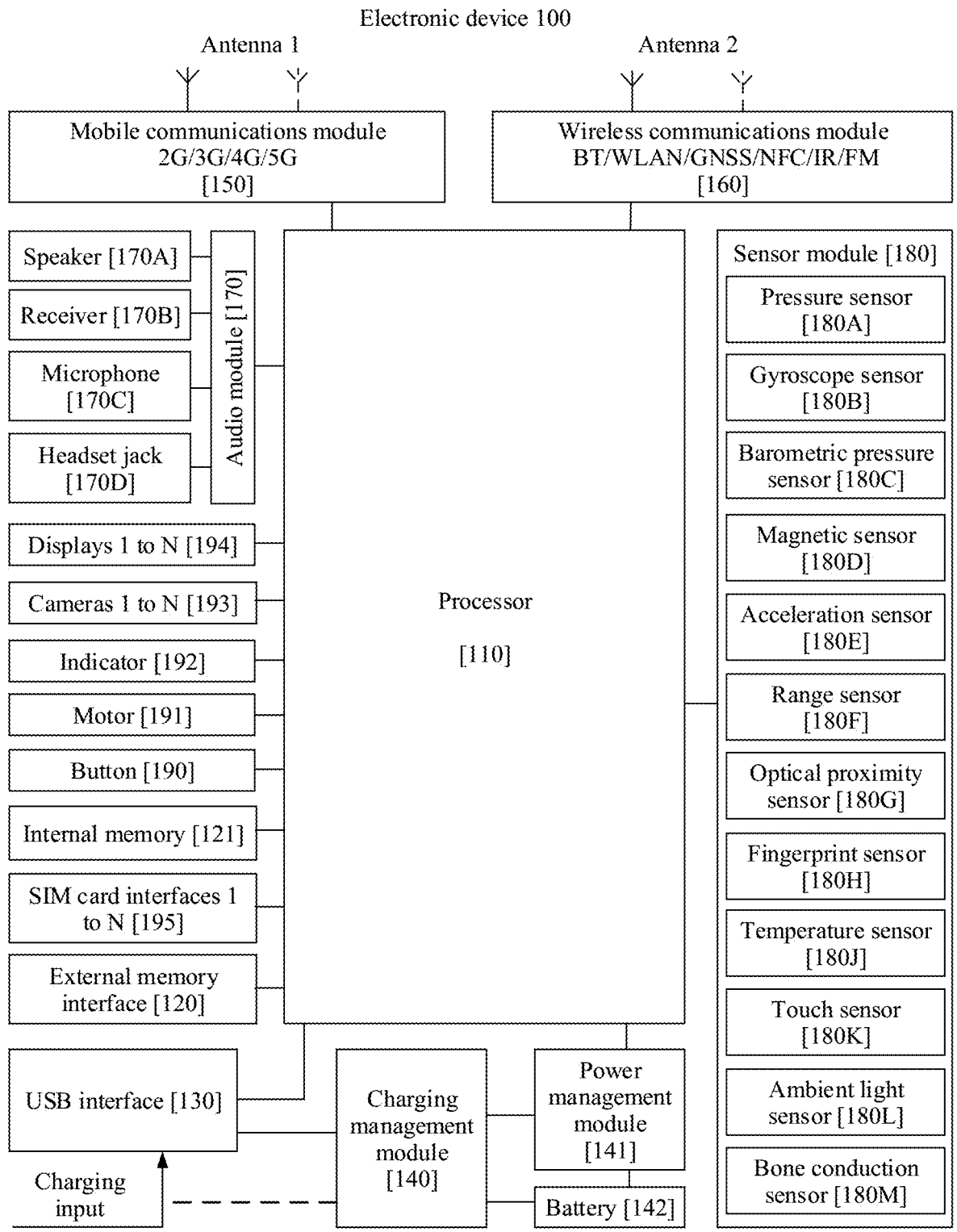
FIG. 1 is a schematic diagram of a hardware structure of an electronic device according to an embodiment of this application.

The following describes technical solutions in the embodiments of this application with reference to the accompanying drawings in the embodiments of this application. In the descriptions of the embodiments of this application, unless otherwise specified, "I" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of the embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

In time-lapse, image content obtained through shooting by a camera within a long time may be played in a manner of a short-time video. For example, time-lapse may be used to shoot clouds, stars, sunrise and sunset, traffic, or flower blooming and falling. In one conventional technology, a professional camera such as a single-lens reflex camera may be used for time-lapse shooting. In this case, a user may proactively set a plurality of time-lapse related parameters, so that the professional camera such as the single-lens reflex camera obtains a time-lapse image frame through shooting based on the parameters indicated by the user. The image frame obtained by the professional camera such as the single-lens reflex camera through shooting may further be processed by dedicated time-lapse software to obtain a time-lapse video.

In another conventional technology, an electronic device such as a mobile phone or a tablet computer may automatically perform time-lapse shooting by using a camera function, and a user does not need to manually set a shooting parameter. However, the electronic device such as the mobile phone or the tablet computer uses a unified mode to perform time-lapse shooting for various shooting scenarios. The unified mode cannot adapt to various different shooting scenarios. Consequently, a relatively good shooting effect cannot be obtained in various different shooting scenarios.

In the conventional technology, the electronic device such as the mobile phone or the tablet computer may obtain a video frame of an original video through shooting based on a video processing algorithm and a video collection frame rate, and then perform frame extraction and video coding on the video frame of the original video to generate a time-lapse video. In this solution, the video collection frame rate of the original video is relatively large, a video frame collection interval of the original video is relatively short, video frame processing duration is relatively short, and a processing effect of the video processing algorithm is relatively poor. Consequently, a video frame image effect is relatively poor, and an image frame effect of the generated time-lapse video is also relatively poor.

An embodiment of this application provides a time-lapse shooting method. The method may be applied to an electronic device. In some embodiments of this application, in a time-lapse mode, the electronic device may obtain a plurality of photos with a relatively good effect through shooting based on a shooting algorithm; and perform video coding on the plurality of photos to automatically generate a time-lapse video with a relatively good effect, without a need of using other time-lapse processing software.

In some other embodiments, in a time-lapse mode, the electronic device may determine a target shooting interval that matches a shot object, to obtain a plurality of photos with a relatively good effect through shooting based on the target shooting interval; and perform video coding on the plurality of photos to automatically generate a time-lapse video with a relatively good effect, without a need of using other time-lapse processing software.

In some other embodiments, in a time-lapse mode, the electronic device may automatically detect a current shooting scenario; obtain, through shooting by using a target shooting parameter (for example, an exposure time parameter or a photosensitivity ISO) that matches the current shooting scenario, a plurality of photos with a relatively good effect that match the current shooting scenario; and perform video coding on the plurality of photos to generate a time-lapse video. In other words, according to the time-lapse shooting method provided in this embodiment of this application, a user does not need to manually set a shooting parameter or does not need to use other time-lapse processing software, and the electronic device may adaptively perform time-lapse shooting in different shooting scenarios to obtain a time-lapse video with a relatively good effect.

In some other embodiments, in a time-lapse mode, the electronic device may automatically detect a current shooting scenario; obtain, through shooting by using a target shooting parameter that matches the current shooting scenario and a target shooting interval that matches a shot object, a plurality of photos with a relatively good effect that match the current shooting scenario; and perform video coding on the plurality of photos to generate a time-lapse video. In other words, according to the time-lapse shooting method provided in this embodiment of this application, a user does not need to manually set a shooting parameter or does not need to use other time-lapse processing software, and the electronic device may adaptively perform time-lapse shooting in different shooting scenarios to obtain a time-lapse video with a relatively good effect.

In addition, compared with the conventional technology in which an electronic device shoots an original video based on a video processing algorithm and performs frame extraction processing, in this embodiment of this application, a photo is obtained through shooting based on a dedicated shooting processing algorithm that matches a current shooting scenario, so that a photo effect is better; and shooting is performed by using a shooting interval that matches a current shot object, the shooting interval is larger than a video collection frame rate, and a photo image processing time is longer, so that quality of a processed photo is better, and an image frame effect of a generated time-lapse video is also better.

For example, the electronic device may be a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (PDA), or a dedicated camera (for example, a single-lens reflex camera or a card camera). A specific type of the electronic device is not limited in the embodiments of this application.

For example, FIG. 1 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to USB standard specifications, and may be a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio through the headset, or may be configured to connect to another electronic device such as an AR device.

It can be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N displays 194, where N is a positive integer greater than 1. In this embodiment of this application, the display 194 may display a preview interface, a shooting interface, and the like in a time-lapse mode, and may further provide a related prompt for the user in a manner of displaying information.

The electronic device 100 may implement a shooting function by using the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193. For example, in the embodiments of this application, the ISP may control, based on a shooting parameter, the photosensitive element to perform exposure and shooting.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1. The camera 193 may be located in an edge area of the electronic device, and may be an in-screen camera, or may be a pop-up camera. A specific location and form of the camera 193 are not limited in this embodiment of this application. The electronic device 100 may include cameras of one or more focus lengths. For example, cameras of different focus lengths may include an ultra-wide-angle camera, a wide-angle camera, a middle-focus camera, or a long-focus camera.

The photosensitive element may collect an image based on a shooting parameter indicated by the ISP. In some embodiments, an operating mode of the photosensitive element may include a high dynamic range (HDR) mode. When the HDR mode is used, the photosensitive element may obtain one group of a plurality of single-frame images with different exposure degrees through shooting, and the single-frame images may be fused to obtain one image with a larger dynamic range.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural network (NN) computing processor, quickly processes input information by referring to a structure of a biological neural network, for example, by referring to a mode of transmission between human brain neurons, and may further continuously perform self-learning. The electronic device 100 may implement applications such as intelligent cognition through the NPU, for example, image recognition, facial recognition, speech recognition, and text understanding.

The external memory interface 120 may be configured to connect to an external memory card such as a micro SD card, to extend a storage capability of the electronic device 100. The external storage card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a sound playing function and an image playing function), and the like. The data storage area may store data created when the electronic device 100 is used (for example, a photo obtained by the electronic device 100 through shooting, a determined target shooting parameter, audio data, or a phone book), and the like. In addition, the internal memory 121 may include a high-speed random access memory, or may include a nonvolatile memory, for example, at least one magnetic disk storage device, a flash memory, or a universal flash storage (UFS).

In this embodiment of this application, by running the instructions stored in the internal memory 121, the processor 110 may detect a current shooting scenario, determine a target shooting parameter based on the current shooting scenario, determine a target shooting interval based on a shot object to obtain a plurality of photos through shooting based on the target shooting parameter and the target shooting interval, and perform video coding on the plurality of photos to generate a time-lapse video.

The electronic device 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call through the speaker 170A.

The receiver 170B, also referred to as an "earpiece", is configured to convert an audio electrical signal into a sound signal. When the electronic device 100 answers a call or listens to a voice message, the receiver 170B may be placed near a human ear to listen to a voice.

The microphone 170C, also referred to as a "mike" or a "microphone", is configured to convert a sound signal into an electrical signal. When making a call or sending a voice message, the user may make a sound near the microphone 170C through the mouth, to enter a sound signal to the microphone 170C. At least one microphone 170C may be disposed in the electronic device 100. In some other embodiments, two microphones 170C may be disposed in the electronic device 100, to implement a noise reduction function in addition to a function of collecting a sound signal. In some other embodiments, three, four, or more microphones 170C may be alternatively disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during shooting. For example, when the shutter is pressed, the gyroscope sensor 180B detects an angle at which the electronic device 100 shakes, and calculates, based on the angle, a distance for which a lens module may compensate, so that the lens cancels the shake of the electronic device 100 through reverse motion, thereby implementing the image stabilization. The gyroscope sensor 180B may be further used in a navigation scenario and a motion-controlled gaming scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a clamshell based on the magnetic sensor 180D. Further, a feature such as automatic unlocking upon opening of the flip cover is set based on a detected opening or closing state of the flip cover or a detected opening or closing state of the clamshell.

The acceleration sensor 180E may detect a magnitude of an acceleration of the electronic device 100 in each direction (usually, on three axes). When the electronic device 100 is still, a magnitude and a direction of gravity may be detected. The acceleration sensor may be further configured to identify a posture of the electronic device, and is used in an application such as switching between a landscape mode and a portrait mode or a pedometer.

The range sensor 180F is configured to measure a distance. The electronic device 100 may measure a distance in an infrared or a laser manner. In some embodiments, in a shooting scenario, the electronic device 100 may measure a distance by using the range sensor 180F, to implement quick focusing.

The optical proximity sensor 180G may include, for example, a light-emitting diode (LED) and an optical detector such as a photodiode. The electronic device 100 may detect, through the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during shooting. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection.

The touch sensor 180K is also referred to as a "touch panel". The touch sensor 180K may be disposed on the display 194. The touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 100 at a location different from that of the display 194.

For example, in this embodiment of this application, the electronic device 100 may detect, through the touch sensor 180K, an operation that the user indicates to start and/or stop time-lapse video shooting.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, shooting and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like.

In this embodiment of this application, in the time-lapse mode, the display 194 may display an interface such as a preview interface or a shooting interface. By running the instructions stored in the internal memory 121, the processor 110 may detect a current shooting scenario, determine a target shooting parameter that matches the shooting scenario, determine a target shooting interval that matches a shot object, to obtain a plurality of photos with a relatively good effect through shooting in the current shooting scenario based on the target shooting parameter and the target shooting interval, and perform video coding on the plurality of photos to generate a time-lapse video with a relatively good effect.

Figure 2A:
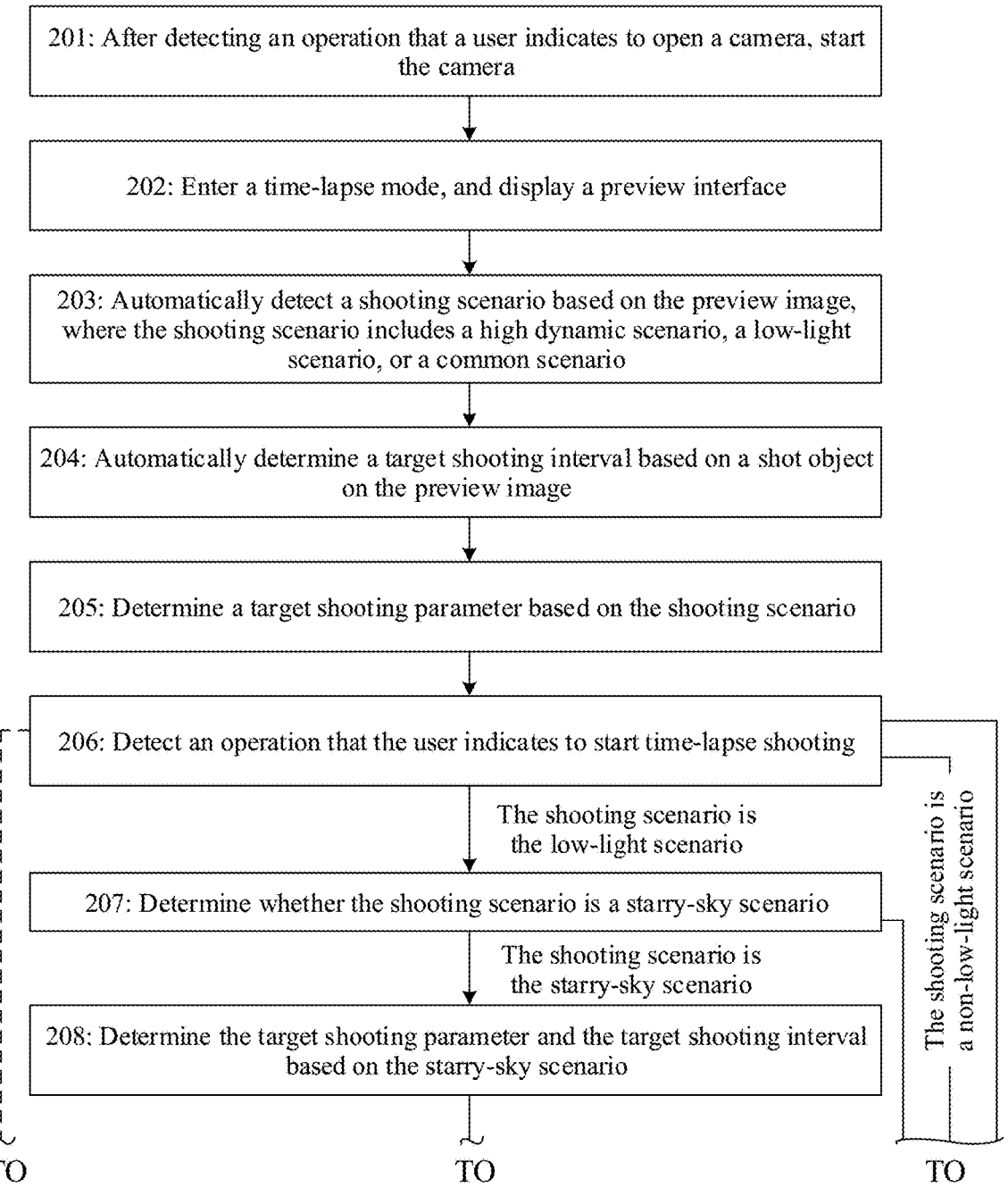
FIG. 2A and FIG. 2B are a flowchart of time-lapse shooting according to an embodiment of this application.
Figure 2B:
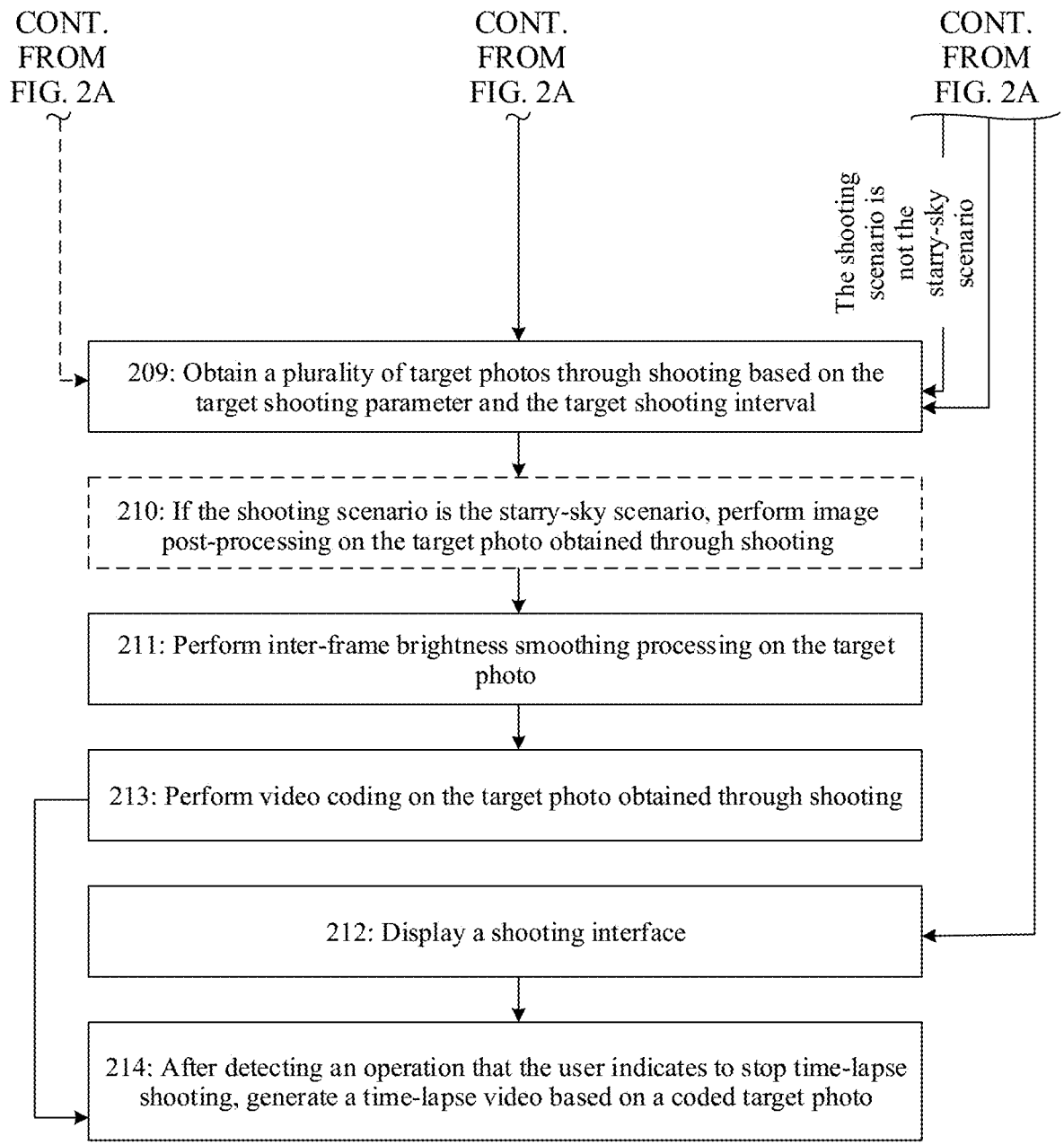

An example in which the electronic device is a mobile phone having the structure shown in FIG. 1 is used below to describe the time-lapse shooting method provided in this embodiment of this application. As shown in FIG. 2A and FIG. 2B, the method may include the following operations.

201: After detecting an operation that a user indicates to open a camera, the mobile phone starts the camera.

When using the mobile phone to perform time-lapse shooting, the user may indicate the mobile phone to start the camera in a plurality of manners, for example, by performing a touch operation, a button operation, an air gesture operation, or a voice operation.

Figure 3A:
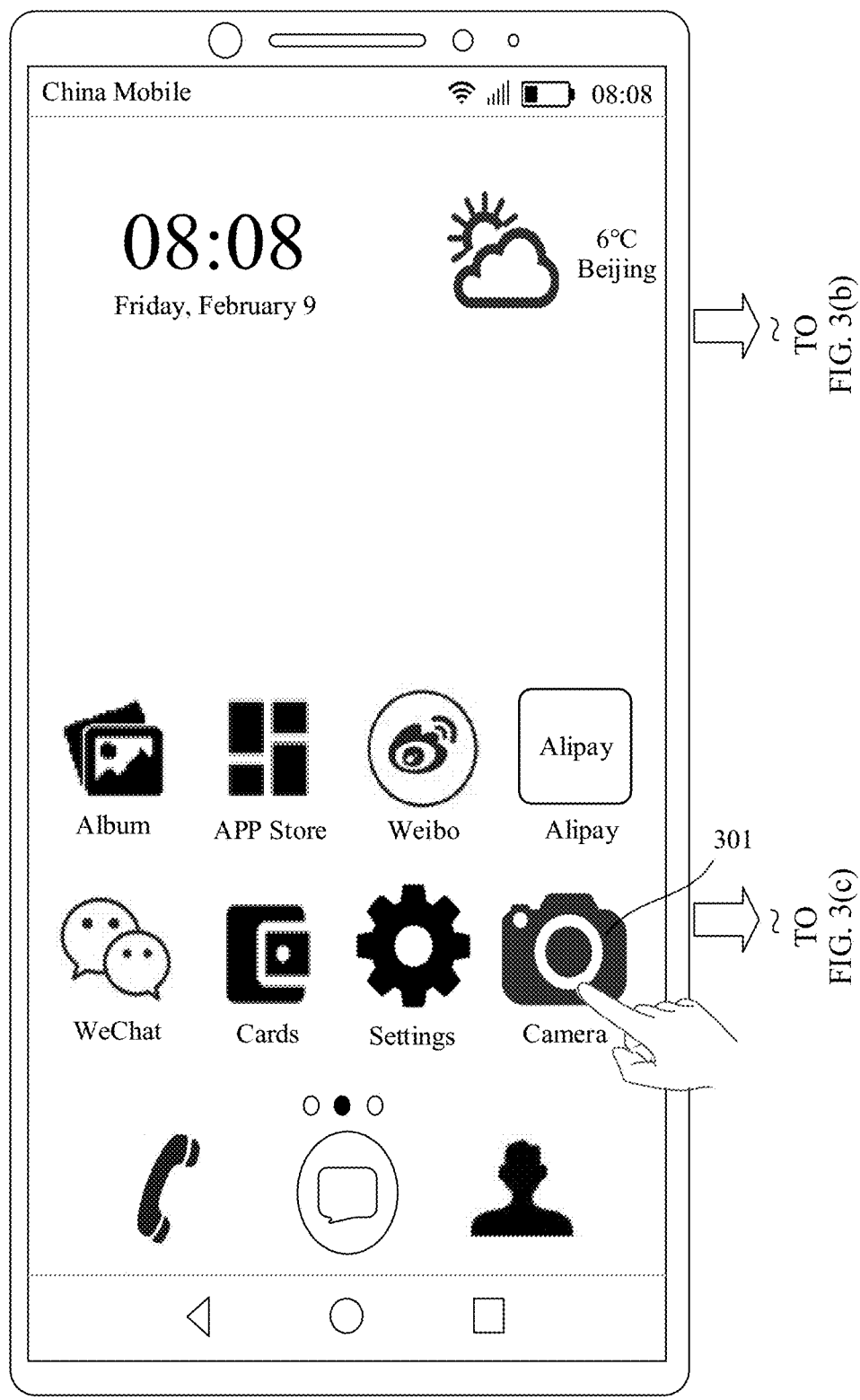

For example, as shown in FIG. 3(a), after detecting an operation that the user taps a camera icon 301, the mobile phone enables a camera function.

202: The mobile phone enters a time-lapse mode, and displays a preview interface in a preview state.

After starting the camera, the mobile phone may automatically enter a photo mode, a video mode, a time-lapse mode, or another shooting mode, and display a preview interface in a corresponding shooting mode in the preview state.

For example, after detecting the operation that the user taps the camera icon 301 shown in FIG. 3(a), the mobile phone may automatically enter the time-lapse mode. After entering the time-lapse mode, the mobile phone may display a preview interface 302 shown in FIG. 3(b), and a preview image is displayed on the preview interface.

In the preview state, the mobile phone collects an image based on a preset preview frame rate (for example, 30 fps (frames per second)). The mobile phone may determine a preview shooting parameter in real time based on a current environment (for example, a factor such as ambient light), and perform exposure based on the preview shooting parameter, to generate a preview image and display the preview image on the preview interface. The preview shooting parameter may include parameters such as an exposure time parameter and a photosensitivity ISO. The mobile phone may include an automatic exposure (AE) module, and the automatic exposure module may determine the preview shooting parameter in real time based on the current environment. In addition, the mobile phone may further perform autofocus (AF) processing to generate a relatively clear preview image.

Figure 3B:
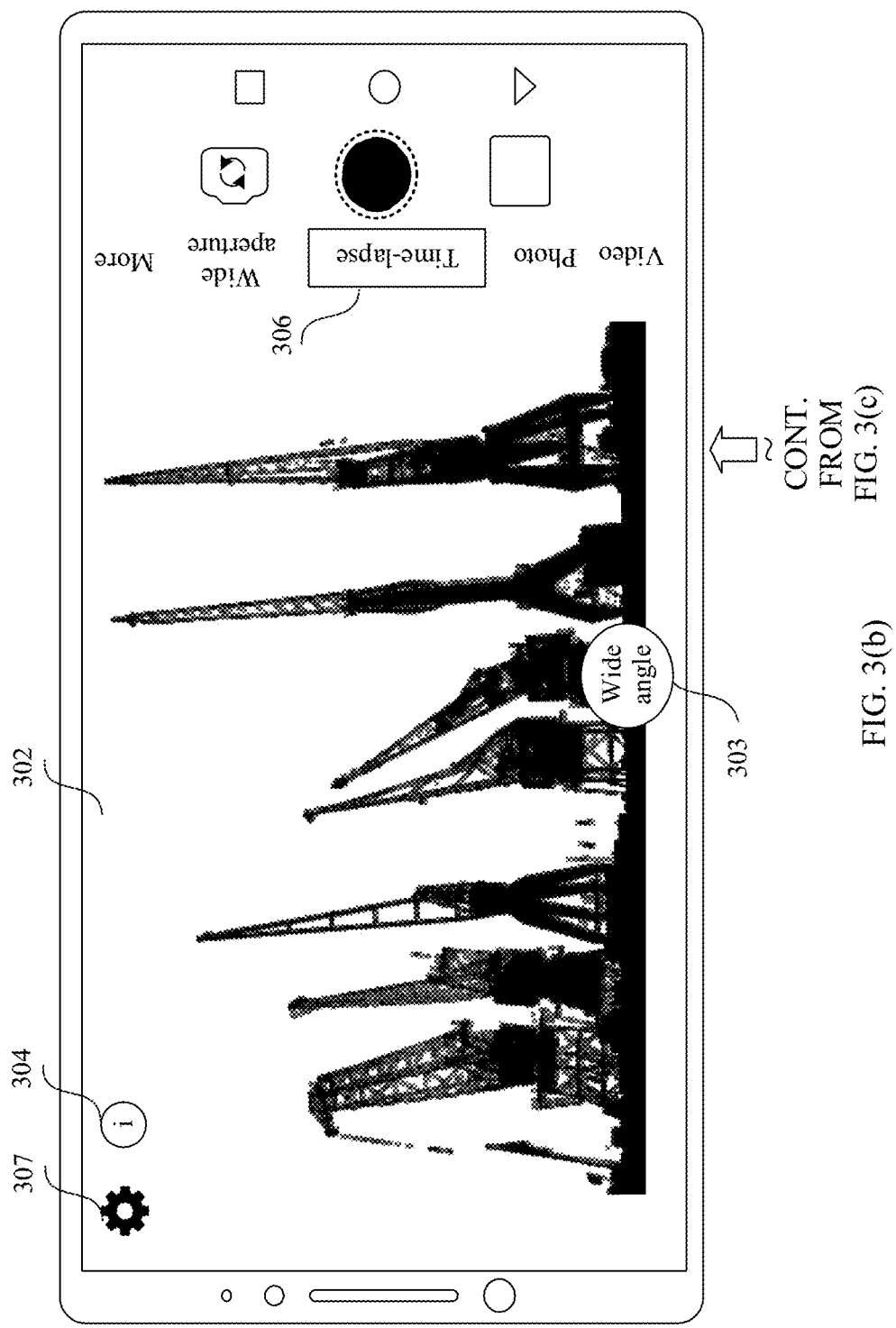
Figure 3B:
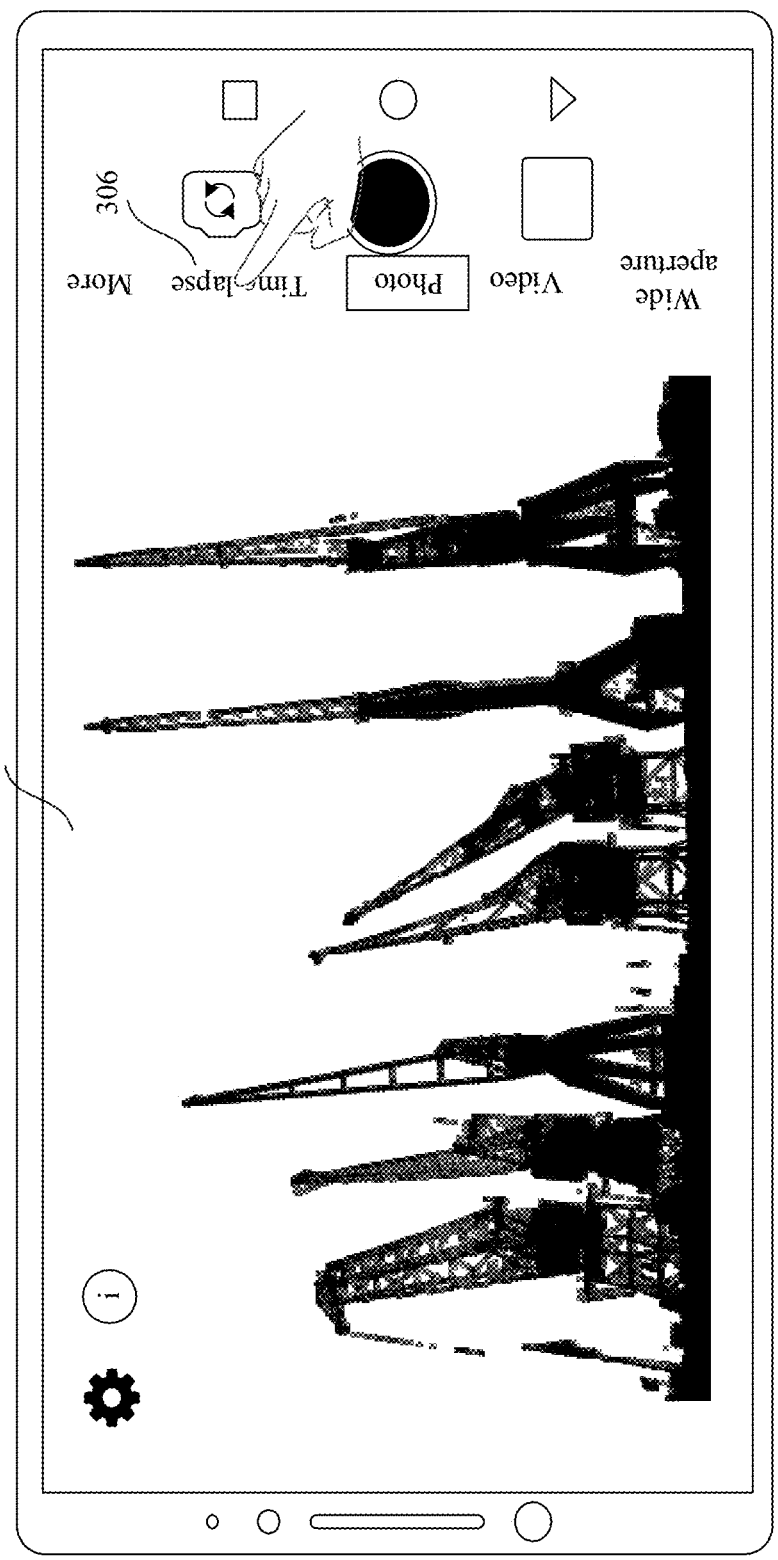

In the time-lapse mode, cameras used to collect an image may be switched. For example, as shown in FIG. 3(b), a control 303 on the preview interface 302 indicates that a camera currently used by the mobile phone to collect an image is a wide-angle camera. After detecting an operation that the user taps the control 303, the mobile phone may display an option of another camera such as a middle-focus camera, a long-focus camera, or an ultra-wide-angle camera, so that the user indicates to switch to another camera to collect an image. In addition, the preview interface 302 may further include a function control 304. After detecting an operation that the user taps the control 304, the mobile phone may display a function and a feature of a current shooting mode.

If the mobile phone does not enter the time-lapse mode after starting the camera, the mobile phone may enter the time-lapse mode after detecting an operation that the user indicates to enter the time-lapse mode.

For example, after detecting the operation that the user taps the camera icon 301 shown in FIG. 3(a), the mobile phone may automatically enter the photo mode, and display a preview window 305 shown in FIG. 3(c). If the mobile phone detects an operation that the user taps a control 306, the mobile phone may enter the time-lapse mode.

Figure 4A:
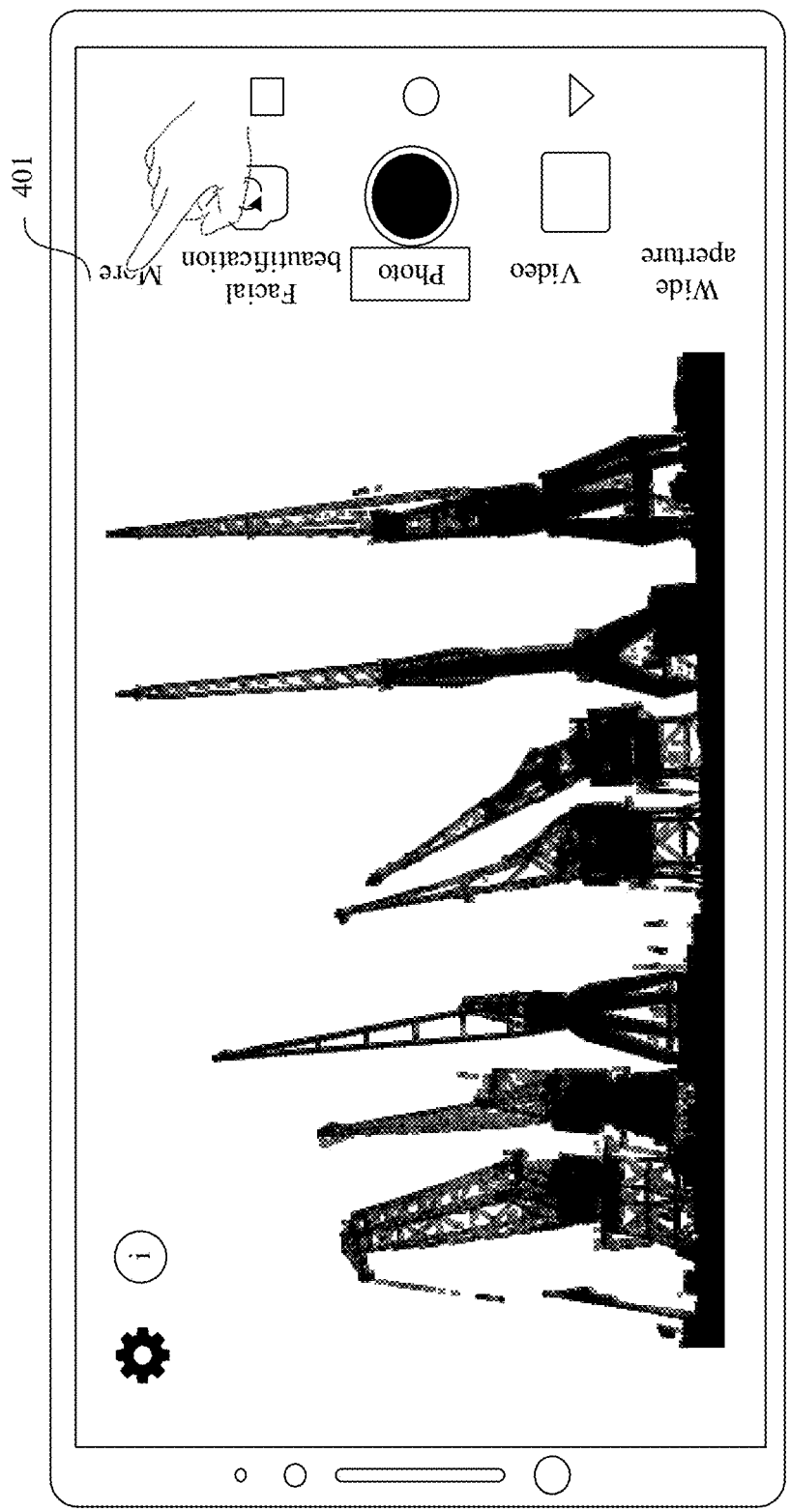
FIG. 4(a) to FIG. 4(c) are schematic diagrams of another group of interfaces according to an embodiment of this application.
Figure 4B:
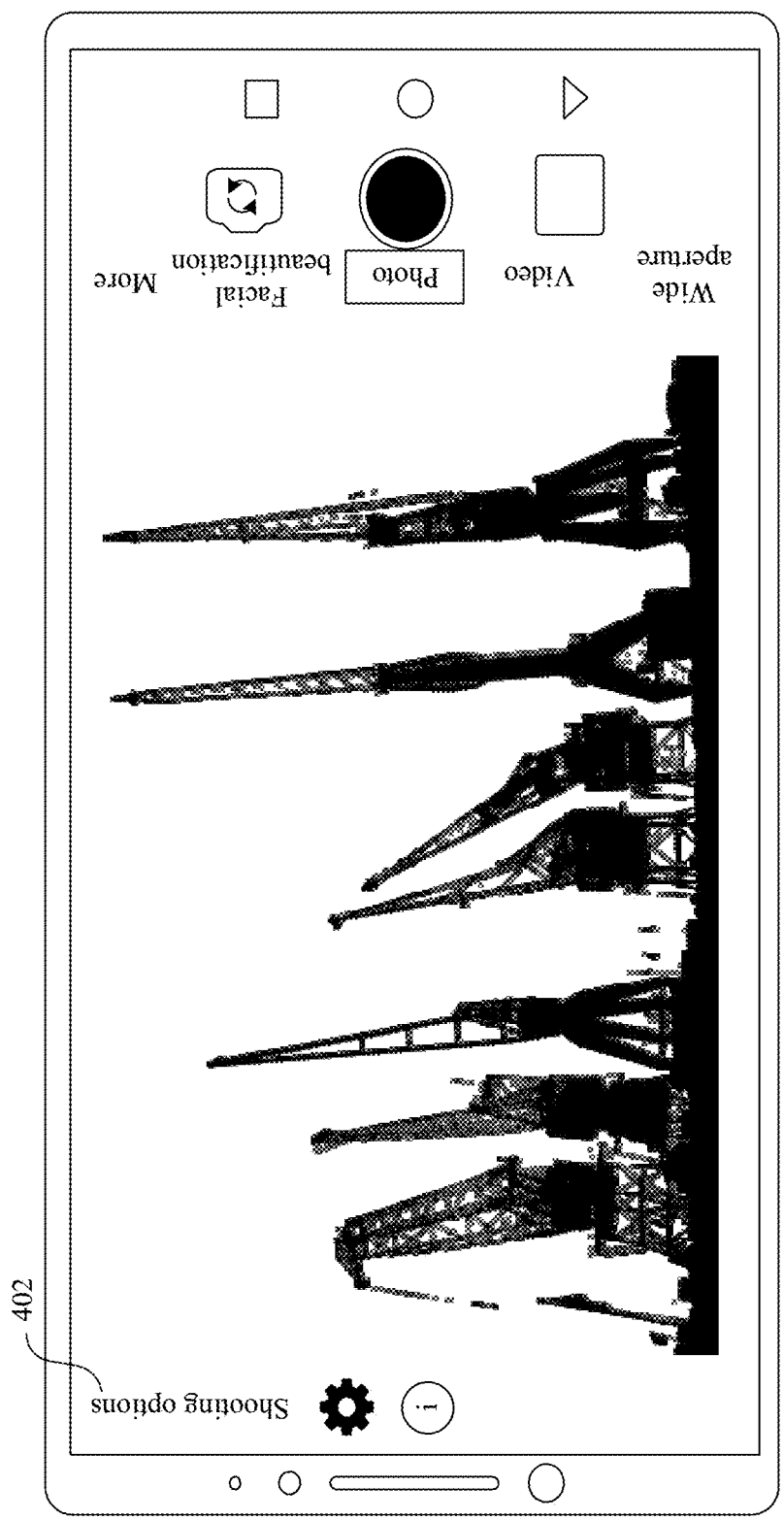
Figure 4C:
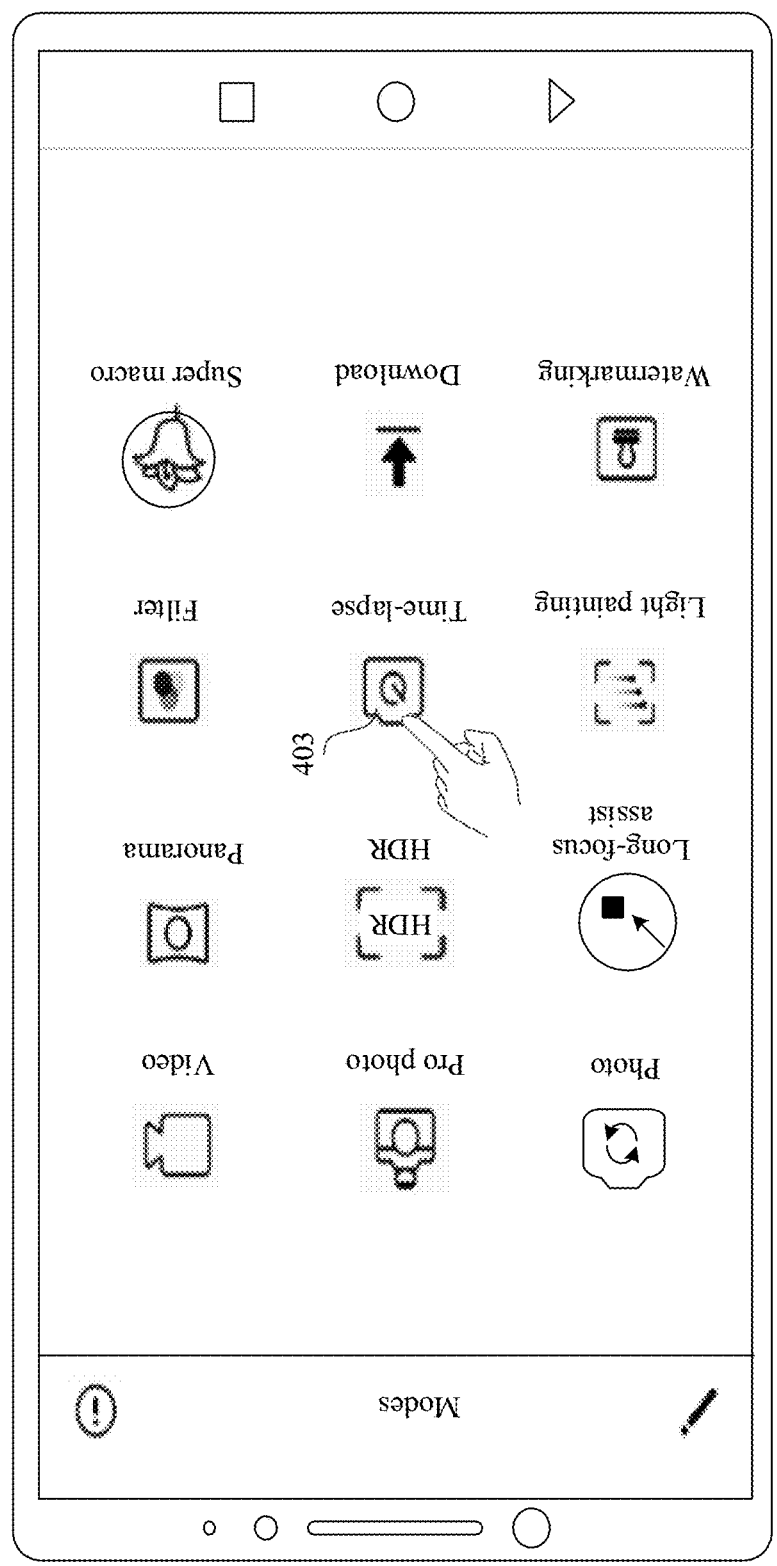

For another example, on a preview interface in a photo mode shown in FIG. 4(a), if the mobile phone detects an operation that the user taps a control 401, the mobile phone may display a setting interface shown in FIG. 4(c). Alternatively, on a preview interface shown in FIG. 4(b), if the mobile phone detects an operation that the user taps a control 402, the mobile phone may display a mode interface shown in FIG. 4(c). Then, if the mobile phone detects an operation that the user taps a control 403, the mobile phone may enter the time-lapse mode.

For another example, in another shooting mode other than the time-lapse mode, after detecting an operation that the user draws a preset track 1 (for example, a "Y" track) on a screen, the mobile phone enters the time-lapse mode.

In some other embodiments, when the mobile phone displays a desktop or displays an interface of another application, and when the user wants to use the time-lapse mode of the mobile phone, the mobile phone may enable the camera function and directly enter the time-lapse mode according to a user indication such as the touch operation, the air gesture operation, the voice operation, or the button operation.

Figure 5:
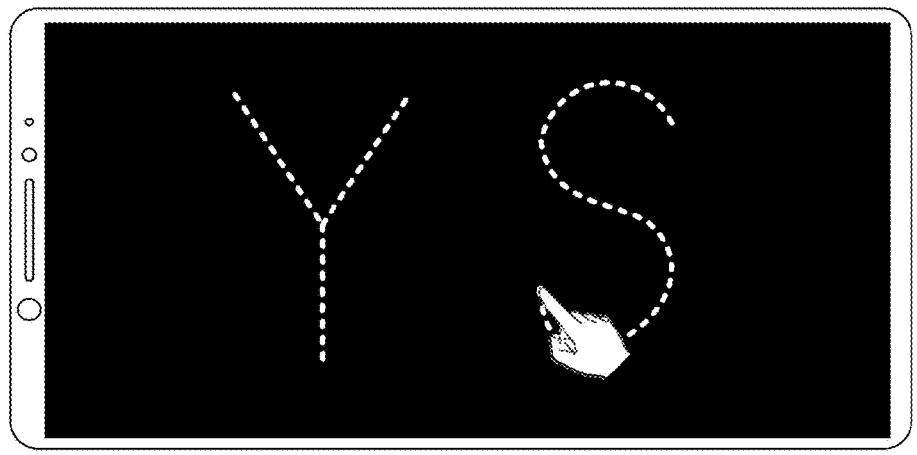
FIG. 5 is a schematic diagram of an interface according to an embodiment of this application.

For example, when the mobile phone displays the desktop or displays the interface of the another application, if the mobile phone receives a voice indication that the user indicates to enter the time-lapse mode, the mobile phone starts the camera and enters the time-lapse mode. For another example, in a case in which the screen is turned on and the desktop is displayed, or in a black-screen case shown in FIG. 5, if the mobile phone detects an operation that the user draws a preset track 2 (for example, a "YS" track) on the screen, the mobile phone starts the camera and enters the time-lapse mode.

The foregoing manner of entering the time-lapse mode is merely an example for description. The mobile phone may alternatively enter the time-lapse mode in another manner. This specific manner is not limited in this embodiment of this application.

It should be noted that, after the mobile phone starts the camera and before the mobile phone detects an operation that the user indicates to start time-lapse video shooting, the mobile phone may adjust a preview shooting parameter in real time based on a change of a shooting environment (for example, ambient light) by using the automatic exposure module; and the mobile phone may collect a preview image and display the preview image based on a preview frame rate and the preview shooting parameter that is determined in real time, to display a smooth and real-time updated preview image to the user.

203: The mobile phone automatically detects a current shooting scenario based on the preview image on the preview interface.

After entering the time-lapse mode, the mobile phone may automatically detect, based on the preview image on the preview interface, a current shooting environment and a shooting scenario corresponding to a shot object. For example, the shooting scenario includes one or more of scenario types such as a high dynamic scenario, a low-light scenario, or a common scenario.

The mobile phone may determine the current shooting scenario based on an image parameter corresponding to the preview image. For example, the image parameter may include one or more of parameters such as a brightness distribution histogram, an exposure time parameter, or a photosensitivity ISO. The brightness distribution histogram is used to represent a pixel brightness distribution status of the preview image. Brightness may be a value corresponding to a Y channel when the preview image is in a YUV format. The following separately describes in detail detection and identification of different shooting scenarios.

(1) High Dynamic Scenario

The high dynamic scenario is a shooting scenario that includes both a shot object with low brightness and a shot object with high brightness. A brightness range of the high dynamic scenario is relatively wide. The mobile phone may determine, based on the brightness distribution histogram of the preview image, whether the current shooting scenario is the high dynamic scenario.

For example, if the mobile phone determines, based on the brightness distribution histogram of the preview image, that brightness of the preview image is mainly distributed in a brightness range 1 with relatively low brightness and a brightness range 2 with relatively high brightness, the mobile phone may determine that a brightness range of the current shooting scenario is relatively wide, the current shooting scenario includes a shot object with relatively low brightness and a shot object with relatively high brightness, and the current shooting scenario is the high dynamic scenario.

That brightness of the preview image is mainly distributed in a brightness range 1 and a brightness range 2 means that a percentage of pixels whose brightness is within the brightness range 1 and the brightness range 2 on the preview image is greater than or equal to a preset value 1. For example, a pixel brightness range is 0 to 255, the brightness range 1 may be [0, 54], the brightness range 2 may be [192, 255], and the preset value 1 may be 80%.

Figure 6A:
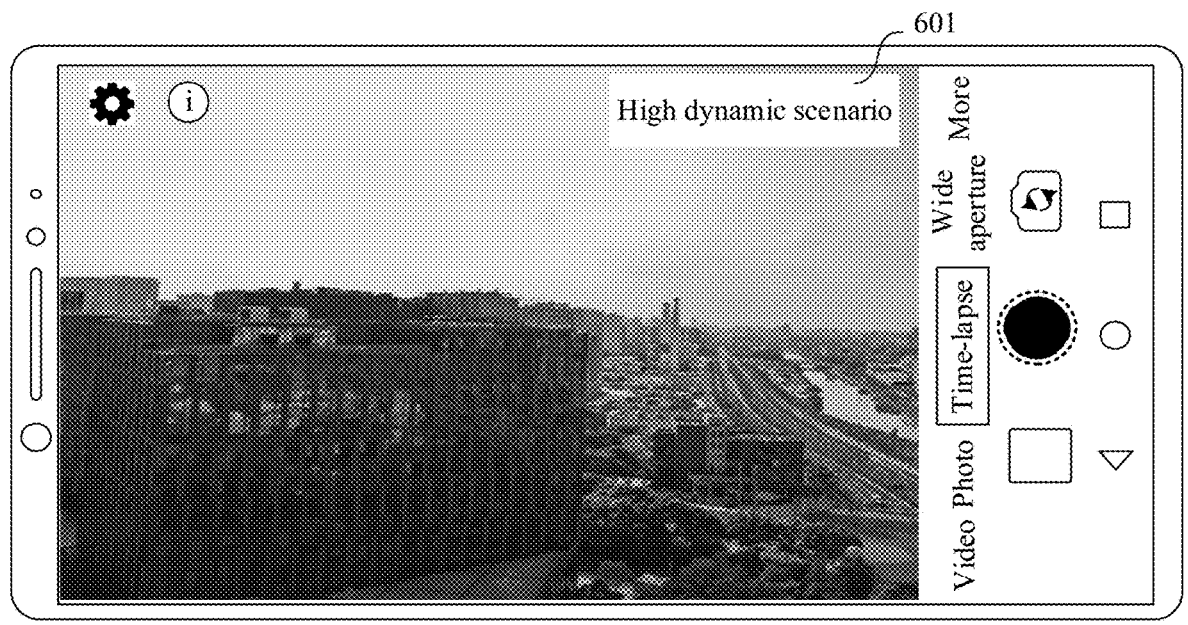
FIG. 6(a) and FIG. 6(b) are schematic diagrams of a group of high dynamic scenarios according to an embodiment of this application.
Figure 6B:
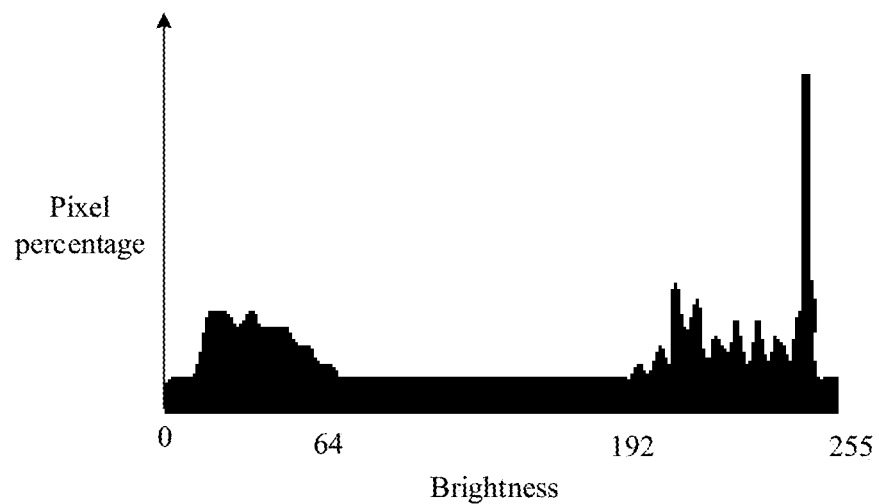

For example, for the preview interface in the high dynamic scenario, refer to FIG. 6(a), and for the brightness distribution histogram corresponding to the preview image, refer to FIG. 6(b). In an urban scenery scenario shown in FIG. 6(a), brightness of a shot object such as a distant sky or a river is relatively high, and brightness of a shot object such as a nearby high-rise and a tree in the shadow of the high-rise is relatively low.

(2) Low-Light Scenario

The low-light scenario is a shooting scenario in which ambient light brightness is less than a preset value 2, that is, a shooting scenario in which ambient light is relatively dark. A value of the preset value 2 is relatively small, for example, may be 5 lux. When the ambient light is relatively dark, the brightness of the preview image is also relatively low. Therefore, if overall brightness of the preview image is relatively low, it may indicate that current ambient light brightness is relatively dark, and the current shooting scenario is the low-light scenario.

In some embodiments, the mobile phone may estimate an ambient brightness Lv value based on an exposure time parameter and an ISO. If the ambient brightness Lv value is less than a preset value 3, it may indicate that the ambient light brightness is less than the preset value 2. In this case, the mobile phone may determine that the current ambient light brightness is relatively low, and the current shooting scenario is the low-light scenario. For example, the preset value 3 may be 30 candelas per square meter (cd/m2).

In some other embodiments, if the mobile phone determines, based on the brightness distribution histogram of the preview image, that the brightness of the preview image is mainly distributed in a brightness range 3 with relatively low brightness, the mobile phone may determine that the overall brightness of the preview image is relatively low, and the current shooting scenario is the low-light scenario. That the brightness of the preview image is mainly distributed in a brightness range 3 means that a percentage of pixels whose brightness is within the brightness range 3 on the preview image is greater than or equal to a preset value 4. For example, the brightness range 3 may be [0, 20], and the preset value 4 may be 90%.

Figure 7A:
FIG. 7(a) to FIG. 7(c) are schematic diagrams of a group of low-light scenarios according to an embodiment of this application.
Figure 7B:
Figure 7C:
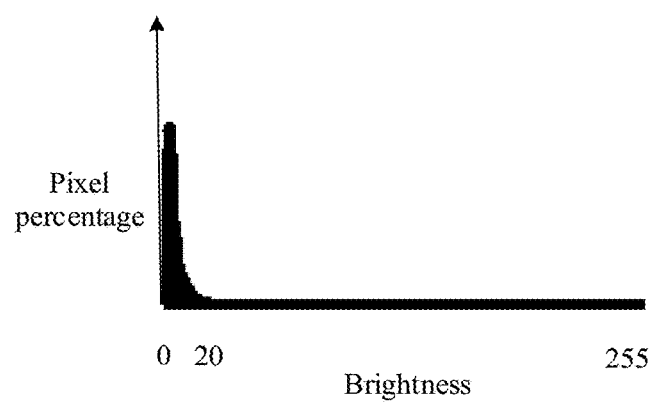

For example, for the preview interface in the low-light scenario, refer to FIG. 7(a) or FIG. 7(b), and for the brightness distribution histogram corresponding to the preview image, refer to FIG. 7(c). In a night environment shown in FIG. 7(a) or FIG. 7(b), brightness of a shot object is relatively low.

It should be noted that, after determining that the current shooting scenario is the low-light scenario, the mobile phone may further determine whether the current shooting scenario is a starry-sky scenario. In some embodiments, after determining, in the preview state, that the current shooting scenario is the low-light scenario, the mobile phone may automatically determine whether the current shooting scenario is the starry-sky scenario.

In some other embodiments, after determining, in the preview state, that the current shooting scenario is the low-light scenario, the mobile phone temporarily does not determine whether the current shooting scenario is the starry-sky scenario, but determines, after detecting an operation that the user indicates to start time-lapse shooting, whether the current shooting scenario is the starry-sky scenario. In the following embodiments, this case is mainly used as an example to describe a process of detecting the starry-sky scenario. For details, refer to related descriptions below.

(3) Common Scenario

In the common scenario, ambient light brightness is relatively high. The common scenario may be a non-high dynamic scenario in which ambient light brightness is greater than or equal to the preset value 2. The mobile phone may estimate the ambient light brightness based on an exposure time parameter and an ISO. If the ambient light brightness is greater than or equal to the preset value 3, it may indicate that the ambient light brightness is greater than or equal to the preset value 2. In this case, the mobile phone may determine that the current ambient light brightness is relatively high, and the current shooting scenario is a non-low-light scenario, in other words, may be the common scenario or the high dynamic scenario.

In addition, in the common scenario, brightness distribution of a shooting environment and a shot object is relatively even. If the mobile phone determines, based on the brightness distribution histogram of the preview image, that the brightness of the preview image is relatively evenly distributed in the entire brightness range from 0 to 255, the mobile phone may determine that the current shooting scenario is not the high dynamic scenario but the common scenario.

Figure 8A:
FIG. 8(a) and FIG. 8(b) are schematic diagrams of a group of common scenarios according to an embodiment of this application.
Figure 8B:
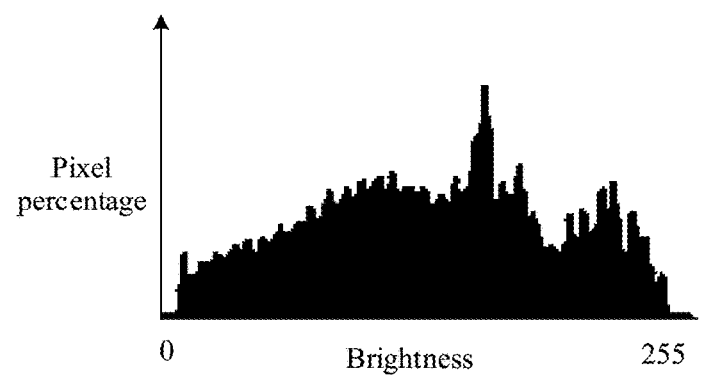

For example, for the preview interface in the common scenario, refer to FIG. 8(a), and for the brightness distribution histogram corresponding to the preview image, refer to FIG. 8(b). In a shooting scenario shown in FIG. 8(a), ambient brightness is relatively high, and brightness of a shot object is relatively high.

In some embodiments, after identifying the scenario type of the current shooting scenario, the mobile phone may further prompt the user with the scenario type in a manner of using display information, a sound prompt, vibration, an indicator, or the like. For example, as shown in FIG. 6(a), the mobile phone may prompt, by using information of control 601, the user that the current shooting scenario is the high dynamic scenario.

204: The mobile phone automatically determines a target shooting interval based on a shot object on the preview image.

The mobile phone may identify the shot object on the preview image by using a pre-trained neural network model, and determine the corresponding target shooting interval based on the shot object. The target shooting interval is used by the mobile phone to obtain a plurality of target photos through shooting after the mobile phone detects that the user indicates to start time-lapse video shooting. The target shooting interval is a time interval between start moments at which the mobile phone obtains two adjacent target photos through shooting.

For example, if the mobile phone identifies that the shot object on the preview image is "vehicle flow" or "pedestrian", the mobile phone may determine that the corresponding target shooting interval is 0.5 s. If the mobile phone identifies that the shot object on the preview image is "blue sky and cloud", the mobile phone may determine that the corresponding target shooting interval is 3 s. If the mobile phone identifies that the shot object on the preview image is "sunrise" or "sunset", the mobile phone may determine that the corresponding target shooting interval is 5 s.

In some embodiments, the target shooting interval is further associated with the shooting scenario, and the mobile phone may determine the target shooting interval based on the shot object on the preview image and the current shooting scenario. For example, if the shot object is "vehicle flow", the target shooting interval may be 0.5 s in the common scenario; or the target shooting interval may be 2 s in the low-light scenario.

205: The mobile phone determines a target shooting parameter based on the detected shooting scenario.

After identifying the scenario type of the current shooting scenario, the mobile phone may enter a shooting processing procedure corresponding to the current shooting scenario; adjust and optimize a shooting parameter based on the current shooting scenario, to obtain a plurality of target photos through shooting subsequently based on an optimized target shooting parameter; and then perform video coding on the plurality of target photos to generate a time-lapse video. The target shooting parameter may include one or more of parameters such as the ISO or the exposure time parameter. The following provides descriptions for different shooting scenarios.

(1) High Dynamic Scenario

The mobile phone may include a parameter optimization module. After determining that the current shooting scenario is the high dynamic scenario, the mobile phone may determine a group of target shooting parameters by using the parameter optimization module. The group of target shooting parameters includes a group of exposure time parameters of different duration. When image shooting is performed by using different exposure time parameters, exposure degrees of images obtained through shooting are also different.

The group of target shooting parameters may be a group of preset shooting parameters corresponding to the high dynamic scenario, or may be a group of shooting parameters obtained by the mobile phone through real-time calculation based on the current environment. For example, for the to-be-optimized preview shooting parameter and the optimized target shooting parameter, refer to Table 1.

TABLE 1

| Shooting parameter | (ISO, exposure time parameter) |
|---|---|
| Preview shooting parameter | (121, 20 ms) |
| Target shooting parameter | [(50, 111 us); (50, 111 us); (50, 111 us); (50, 111 us); (50, 1176 us); (50, 111 us)] |

Subsequently, the mobile phone may adjust and update, based on the change of the shooting environment (for example, a factor such as light) by using the parameter optimization module, the target shooting parameter corresponding to the high dynamic scenario in real time.

(2) Low-Light Scenario

After determining that the current shooting scenario is the low-light scenario, the mobile phone may increase the exposure time parameter by using the parameter optimization module (for example, may increase the exposure time parameter used for the preview shooting parameter from 30 ms to 60 ms) and reduce the ISO (for example, may reduce the ISO used for the preview shooting parameter to a range of [3000, 6400]), to obtain a group of target shooting parameters that match the current low-light scenario. The target shooting parameter obtained by the mobile phone by increasing the exposure time parameter and reducing the ISO may reduce image noise in a low-light condition and improve image quality of a preview image on the premise that the mobile phone obtains same image brightness. For example, the to-be-optimized shooting parameter may be: exposure time parameter=40 ms, and ISO=12800; and the optimized target shooting parameter may be: exposure time parameter=60 ms, and ISO=5000.

Subsequently, the mobile phone may adjust and update, based on the change of the shooting environment by using the parameter optimization module, the target shooting parameter corresponding to the low-light scenario in real time.

(3) Common Scenario

After determining that the current shooting scenario is the common scenario, the mobile phone may determine the target shooting parameter by using the automatic exposure module. In other words, the target shooting parameter corresponding to the common scenario is a shooting parameter determined by the automatic exposure module in real time based on the shooting environment. It may also be understood that, if the mobile phone determines that the current shooting scenario is the common scenario, the mobile phone may not perform operation 205, but performs shooting processing by using the shooting parameter determined by the automatic exposure module.

206: The mobile phone detects the operation that the user indicates to start time-lapse video shooting.

The user may indicate, in a plurality of manners, for example, by performing a touch operation, a button operation, an air gesture operation, or a voice operation, the mobile phone to start time-lapse video shooting.

For example, as shown in FIG. 8(a), after detecting an operation that the user taps a shooting control 801, the mobile phone starts time-lapse video shooting.

After operation 206, in some embodiments, if the current shooting scenario is the low-light scenario, the mobile phone performs operation 207; or if the current shooting scenario is the non-low-light scenario such as the high dynamic scenario or the common scenario, the mobile phone performs operation 209.

After operation 206, in some other embodiments, the mobile phone directly performs operation 209 to obtain the plurality of target photos through shooting based on the target shooting parameter corresponding to the high dynamic scenario, the low-light scenario, or the common scenario.

207: If the current shooting scenario is the low-light scenario, the mobile phone determines whether the current shooting scenario is the starry-sky scenario; and if the current shooting scenario is not the starry-sky scenario, performs operation 209; or if the current shooting scenario is the starry-sky scenario, performs operation 208.

If the mobile phone determines, in operation 204, that the current shooting scenario is the low-light scenario, after the mobile phone detects the operation that the user indicates to start time-lapse video shooting, refer to the following descriptions, to be specific, the mobile phone may determine whether the current shooting scenario is the starry-sky scenario.

The mobile phone determines whether a current shooting parameter is within a parameter range 1. For example, the parameter range 1 may include: 3000≤ISO≤6400, and exposure time parameter≥preset value 5. For example, the preset value 5 may be a value within a range of [20 ms, 60 ms). If the current shooting parameter is within the parameter range 1, the exposure time parameter is relatively large, current ambient light may be very dark, and the current shooting scenario may be the starry-sky scenario. If the current shooting parameter is not within the parameter range 1, it may indicate that current ambient light is not very dark, and the current shooting scenario may not be the starry-sky scenario. In this case, operation 209 may be performed to perform shooting processing based on the low-light scenario.

If the current shooting parameter is within the parameter range 1, the mobile phone may collect a reference image by using a preset shooting parameter 1. The shooting parameter 1 includes a relatively large exposure time parameter and a relatively small ISO. For example, in the shooting parameter 1, the exposure time parameter may be 4 s, and the ISO may be 3000.

The mobile phone determines whether the reference image includes a starry sky. For example, the mobile phone may input the reference image into a pre-trained starry-sky detection neural network model. If an output result of the starry-sky detection neural network model indicates that the reference image does not include the starry sky, the mobile phone determines that the current shooting scenario is not the starry-sky scenario. In this case, operation 209 may be performed to perform shooting processing based on the low-light scenario. Alternatively, if an output result of the starry-sky detection neural network model indicates that the reference image includes the starry sky, the mobile phone determines that the current shooting scenario is the starry-sky scenario.

In some other embodiments, the mobile phone may not determine whether the current shooting parameter is within the parameter range 1, but directly determines whether the image collected by the mobile phone includes the starry sky.

After detecting that the current shooting scenario is the starry-sky scenario, the mobile phone may also prompt the user with the scenario type through displaying on the interface or by using a sound, a vibration, or the like.

208: The mobile phone determines the target shooting parameter and the target shooting interval based on the starry-sky scenario, and then the mobile phone performs operation 209.

After determining that the current shooting scenario is the starry-sky scenario, the mobile phone may determine, by using the parameter optimization module, the target shooting parameter corresponding to the starry-sky scenario.

For example, when an average brightness value of pixels on a starry-sky image is within a preset brightness range 4, a better starry-sky shooting effect may be obtained. Therefore, the mobile phone may determine whether an average brightness value of pixels on the reference image is within the preset brightness range 4. For example, the brightness range 4 may be [30, 120].

If the average brightness value of the pixels on the reference image is not within the brightness range 4, the mobile phone may keep the ISO (for example, may be 3000) in the shooting parameter 1 unchanged; calculate anew exposure time parameter based on a current exposure time parameter and a difference between the average brightness value and the brightness range 4, to obtain an image of relatively good quality by using a relatively large exposure time parameter in a case in which ambient light is relatively dark; and obtain more frames by reducing the exposure time parameter as much as possible on the premise of ensuring image quality. The mobile phone obtains a new reference image through shooting again based on the new exposure time parameter. Then, the mobile phone determines again whether an average brightness value of pixels on the new reference image is within the preset brightness range 4.

If the mobile phone determines that the average brightness value of the reference image is within the brightness range 4, the mobile phone may further determine whether brightness of most pixels on the reference image is within the brightness range 4. For example, if a percentage of pixels whose brightness is within the brightness range 4 on the reference image is greater than or equal to 50%, the mobile phone may determine that the brightness of the most pixels on the reference image is within the brightness range 4.

If the brightness of the most pixels on the reference image is within the brightness range 4, a shooting parameter corresponding to the reference image is the target shooting parameter corresponding to the starry-sky scenario. For example, the target shooting parameter corresponding to the starry-sky scenario may be: exposure time parameter=30 s, and ISO=3200.

If the brightness of the most pixels on the reference image is not within the brightness range 4, the mobile phone may keep the ISO (for example, may be 3000) in the shooting parameter 1 unchanged, and determine a new exposure time parameter based on the current exposure time parameter and the average brightness value, so that brightness of most pixels on a new reference image obtained through shooting based on the new exposure time parameter is within the brightness range 4.

In this embodiment of this application, to avoid relatively poor user experience caused when a waiting time is excessively long after the user indicates to start shooting, a parameter optimization process of the target shooting parameter that corresponds to the starry-sky scenario and that is determined by the mobile phone should not be excessively time-consuming. Therefore, in some embodiments, if a quantity of adjustments performed by the mobile phone on a shooting parameter based on a reference image is greater than or equal to a preset value 6 (for example, may be 4), the mobile phone may stop reference image shooting, and directly adjust a shooting parameter corresponding to a current reference image, to obtain the target shooting parameter. In some other embodiments, if duration in which the mobile phone determines the parameter optimization process is greater than or equal to a preset value 7 (for example, may be 1 min), the mobile phone may stop reference image shooting, and adjust a shooting parameter corresponding to a current reference image, to obtain the target shooting parameter. In still some embodiments, if an exposure time parameter corresponding to a current reference image is greater than a preset value 8 (for example, may be 15 s), a new exposure time parameter may be greater than the preset value 8, and it takes a relatively long time to obtain a reference image through shooting again. Consequently, the parameter optimization process may exceed the preset value 7. In this case, the mobile phone may stop reference image shooting, and directly adjust a shooting parameter corresponding to the current reference image, to obtain the target shooting parameter.

By using the target shooting parameter corresponding to the starry-sky scenario that is determined in the foregoing manner, a star that emits light weakly in the night sky can also obtain a sufficient exposure amount, and brightness of the star is improved. Therefore, a star that cannot be seen by a human eye is visible to a naked eye in a shooting result.

After determining that the current shooting scenario is the starry-sky scenario, the mobile phone may detect a shot object based on the reference image, to determine a corresponding target shooting interval. For example, the shot object may be content such as "starry sky", "the Milky Way", or "moon", and a target shooting interval corresponding to "starry sky" may be 20 s.

209: The mobile phone obtains the plurality of target photos through shooting based on the target shooting parameter and the target shooting interval.

It should be noted that operation 205 may be performed before operation 206, or may be performed after operation 206. In addition, in a non-starry-sky scenario, the mobile phone may determine a new target shooting parameter in real time based on a current shooting scenario and a shooting environment (for example, factors such as ambient light). After detecting the operation that the user indicates to start shooting, the mobile phone obtains the plurality of target photos through shooting based on the target shooting interval and the real-time updated target shooting parameter.

In the high dynamic scenario, the mobile phone may switch an operating mode of a camera sensor (that is, the foregoing photosensitive element) to a high dynamic HDR mode. The parameter optimization module may provide the automatic exposure module with the target shooting parameter, and the automatic exposure module may configure the target shooting parameter to the ISP. The ISP controls the camera sensor to obtain a group of multi-frame images with different exposure degrees through shooting based on the group of shooting parameters. The mobile phone fuses the group of multi-frame images (for example, may be in a Raw format) with different exposure degrees based on an HDR algorithm, to obtain one target photo (for example, may be in a YUV format) whose dynamic range is greater than that of a single-frame of image. The mobile phone generates the plurality of target photos based on the target shooting interval.

In the low-light scenario, the parameter optimization module may provide the automatic exposure module with the target shooting parameter, and the automatic exposure module may control, by using the ISP, the camera to perform exposure based on a target exposure parameter. The mobile phone obtains the plurality of target photos through shooting based on the target shooting interval and the target shooting parameter corresponding to the low-light scenario.

In the common scenario, the mobile phone obtains the plurality of target photos through shooting based on the target shooting interval and the target shooting parameter corresponding to the common scenario. The target shooting parameter is a shooting parameter determined by the automatic exposure module in real time based on the shooting environment.

In some embodiments, in a time-lapse shooting process, the mobile phone may further continue to detect the current shooting scenario. If the shooting scenario changes, the mobile phone determines a new target shooting parameter based on a changed shooting scenario, and switches to obtaining a target photo through shooting based on the new target shooting parameter corresponding to the new shooting scenario.

In the starry-sky scenario, the parameter optimization process for the target shooting parameter requires a relatively long time, and it is inconvenient to adjust and optimize the target shooting parameter in real time in the shooting process. Therefore, after determining the target shooting parameter in operation 208, the mobile phone may obtain the target photo through shooting by using the target shooting parameter and the target shooting interval in the time-lapse shooting process.

In some embodiments, after determining the target shooting interval, the mobile phone does not update the target shooting interval until a current shooting process is completed. In some other embodiments, after determining the target shooting interval, if the mobile phone determines that the shot object changes, the mobile phone updates the target shooting interval in real time based on a changed shot object.

210: If the current shooting scenario is the starry-sky scenario, the mobile phone performs image post-processing on the target photo obtained through shooting.

If the current shooting scenario is the starry-sky scenario, the mobile phone may perform image post-processing such as image enhancement. Because light in a starry-sky shooting environment is usually relatively dark, a starry-sky image obtained by using a low ISO and long exposure still include a small amount of noise, and color and contrast effects may not be very good. To improve aesthetic feeling of the starry-sky image, the mobile phone may perform image enhancement on the target photo. For example, the mobile phone may invoke a starry-sky noise reduction network model to perform noise reduction processing on the target photo obtained through shooting in the starry-sky scenario, so as to reduce a noise level of the starry-sky image. For another example, the mobile phone may alternatively invoke a starry-sky enhancement neural network model to perform processing such as brightness improvement, contrast enhancement, and saturation enhancement on a starry-sky region in the target photo obtained through shooting in the starry-sky scenario, so as to improve aesthetic feeling of the starry-star image.

Figure 9A:
FIG. 9(a) and FIG. 9(b) are schematic diagrams of effects generated before and after image enhancement according to an embodiment of this application.
Figure 9B:
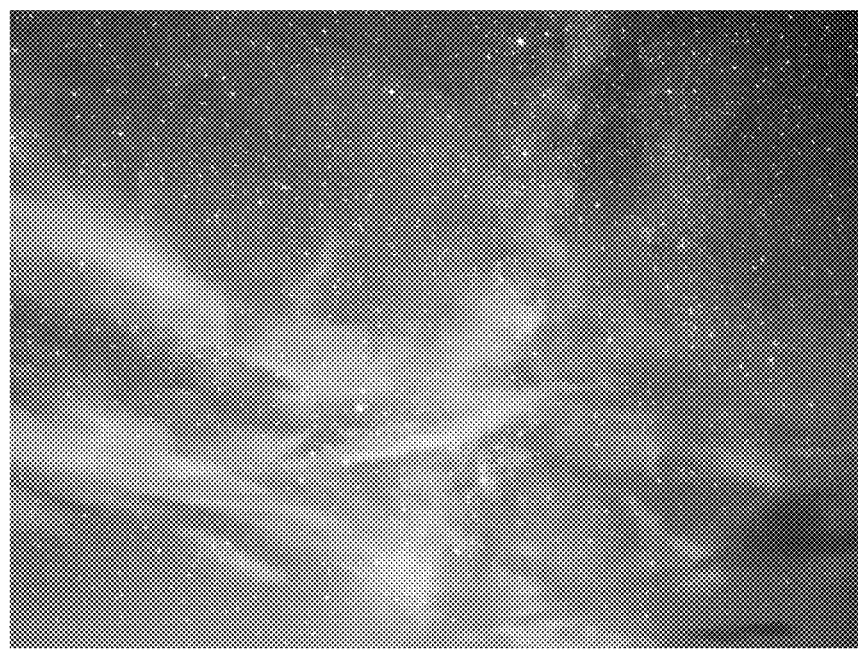

For example, for a target photo on which image enhancement is not performed, refer to FIG. 9(*a*), and for a target photo obtained after image enhancement, refer to FIG. 9(*b*).

If the current shooting scenario is the non-starry-sky scenario, in some embodiments, because an effect of the target photo obtained through shooting based on the target parameter is relatively good, the mobile phone may not perform post-processing on the target photo. In some other embodiments, the mobile phone may alternatively perform post-processing such as color processing and saturation processing on the target photo, to further improve image quality of the target photo.

211: The mobile phone performs inter-frame brightness smoothing processing on the target photo obtained through shooting.

Because the mobile phone obtains the target photo through shooting based on the target shooting interval, and an interval time between adjacent target photos is relatively long, a problem of a relatively large brightness difference between adjacent target photos is prone to occur. Therefore, the mobile phone may perform inter-frame brightness smoothing processing on the target photo obtained through shooting. This reduces a brightness difference between adjacent target photos, ensures picture brightness smoothness and consistency, and avoids brightness jumping.

For example, the mobile phone may input two adjacent target photos into a pre-trained inter-frame brightness smoothing neural network model, and a brightness difference between the two target photos that are output from the inter-frame brightness smoothing neural network model and n (for example, may be 6) previous target photos is relatively small. For example, the inter-frame brightness smoothing processing can effectively suppress brightness flickering between two adjacent frames of target photos between which an average brightness value difference is within 40%.

Figure 11:
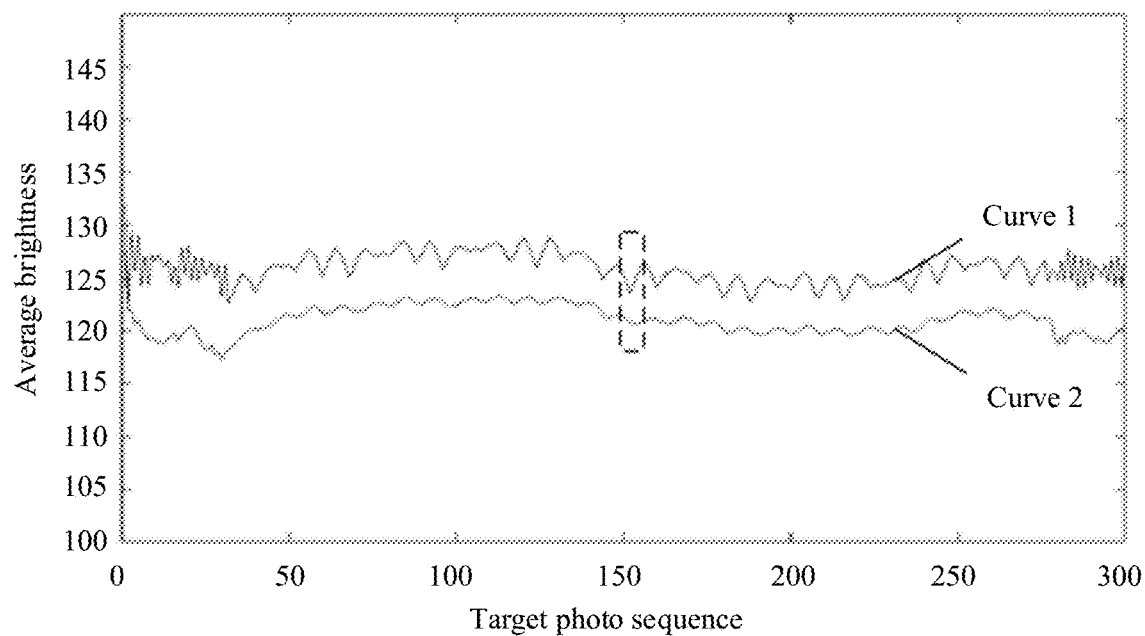
FIG. 11 is a comparison diagram of brightness curves generated before and after inter-frame brightness smoothing processing according to an embodiment of this application.

For example, before the inter-frame brightness smoothing processing, for the plurality of target photos obtained by the mobile phone through shooting, refer to FIG. 10A-(a) to FIG. 10A-(f), and for a curve of a brightness change between corresponding adjacent target photos, refer to a curve 1 in FIG. 11. After the inter-frame brightness smoothing processing, for the plurality of target photos obtained by the mobile phone through shooting, refer to FIG. 10B-(a) to FIG. 10B-(f), and for a curve of a brightness change between corresponding adjacent target photos, refer to a curve 2 in FIG. 11. It can be learned through comparison between FIG. 10A-(a) to FIG. 10A-(f) and FIG. 10B-(a) to FIG. 10B-(f) that a brightness difference between adjacent target photos is relatively small after the inter-frame brightness smoothing processing. It can be learned through comparison between the curve 1 and the curve 2 in FIG. 11 that a curve of a brightness change between adjacent target photos is relatively smooth after the inter-frame brightness smoothing processing.

212: After detecting the operation that the user indicates to start time-lapse video shooting, the mobile phone displays a shooting interface.

If the current shooting scenario is the non-low-light scenario, the shooting interface is an image collected by the mobile phone based on a relatively high preset frame rate (for example, may be a preview frame rate) and a display shooting parameter (for example, may be a shooting parameter determined by the automatic exposure module in real time based on a current environment or a preset exposure parameter). In this way, in the non-low-light scenario, the mobile phone may smoothly display, in real time by using a relatively high preset frame rate, content obtained through shooting to the user on the shooting interface.

In other words, if the shooting scenario is the non-low-light scenario, after detecting the operation that the user indicates to start time-lapse video shooting, the mobile phone may obtain the plurality of target photos through shooting based on the target shooting interval and the target shooting parameter, to subsequently generate the time-lapse video. In addition, the mobile phone may further collect the image based on the preset frame rate and the display shooting parameter, to display in real time the content obtained through shooting to the user on the shooting interface.

For example, in the high dynamic scenario, after detecting the operation that the user indicates to start time-lapse video shooting, the mobile phone may obtain the plurality of photos through shooting based on the target shooting interval and the target shooting parameter, to subsequently generate the time-lapse video. In addition, the mobile phone may further collect the image based on the preset frame rate and the display shooting parameter, to display in real time the content obtained through shooting to the user on the shooting interface.

For another example, in the common scenario, after detecting the operation that the user indicates to start time-lapse video shooting, the mobile phone may obtain the plurality of photos through shooting based on the target shooting interval and the shooting parameter determined by the automatic exposure module, to subsequently generate the time-lapse video. In addition, the mobile phone may further collect the image based on the preset frame rate and the shooting parameter determined by the automatic exposure module, to display in real time the content obtained through shooting to the user on the shooting interface.

Figure 12A:
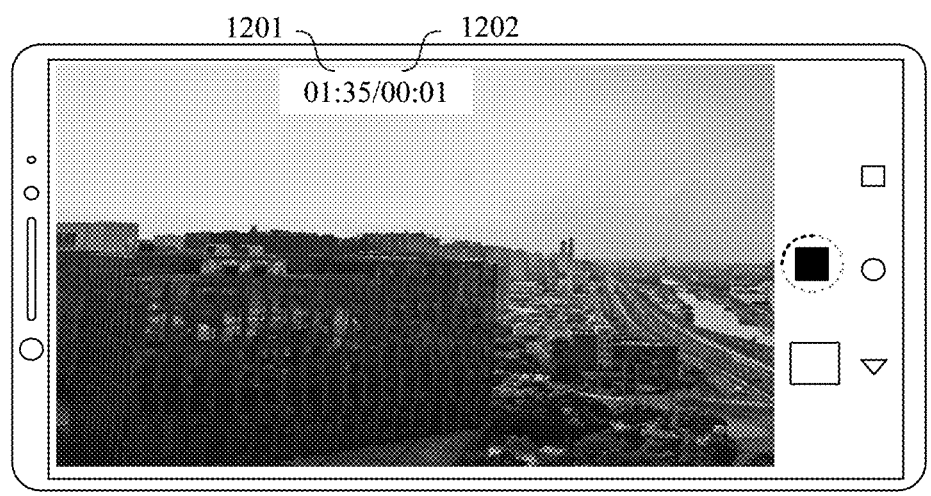
FIG. 12(a) and FIG. 12(b) are schematic diagrams of another group of interfaces according to an embodiment of this application.
Figure 12B:

For example, for a schematic diagram of a time-lapse shooting interface in the high dynamic scenario, refer to FIG. 12(*a*), and for a schematic diagram of a time-lapse shooting interface in the common scenario, refer to FIG. 12(*b*).

In some cases, if the shooting scenario is the low-light scenario, and the mobile phone does not determine, in the low-light scenario, whether the shooting scenario is the starry-sky scenario, the target photo obtained through shooting based on the target shooting parameter corresponding to the low-light scenario may be displayed on the shooting interface. In the low-light scenario, if the image collected by the mobile phone based on the preset frame rate and the display shooting parameter is displayed on the shooting interface, because a shooting environment is relatively dark, and an image obtained through shooting is also relatively dark, the user may fail to see picture content of the image on the shooting interface, and consequently the user is misled that the starry sky is not collected. However, the target photo obtained through shooting based on the target shooting parameter is displayed on the shooting interface, so that an image picture with a relatively good effect can be displayed to the user.

In addition, because the brightness difference between the adjacent target photos is relatively small after the inter-frame brightness smoothing processing, the mobile phone displays, on the shooting interface, the target photo obtained after the inter-frame brightness smoothing processing. Therefore, visual flickering is not prone to be caused to the user, and user's visual experience is relatively good.

In some other cases, if the shooting scenario is the low-light scenario, after detecting the operation that the user indicates to start shooting, the mobile phone may perform an adjustment process for a relatively long time to determine whether the shooting scenario is the starry-sky scenario and determine the corresponding target shooting parameter in the starry-sky scenario. In some embodiments, the mobile phone may collect an image based on the target shooting parameter corresponding to the low-light scenario and a frame rate 1, and display the collected image on the shooting interface. The frame rate 1 is relatively large, and may be greater than the frame rate corresponding to the target shooting interval. In this way, the mobile phone can display a collected image picture to the user in real time. In some other embodiments, the shooting interface displayed by the mobile phone in the adjustment process includes the image collected by the mobile phone based on the preset frame rate and the display shooting parameter. In some other embodiments, the shooting interface displayed by the mobile phone in the adjustment process includes the foregoing reference image collected by the mobile phone in the adjustment process. In some other embodiments, the mobile phone does not display an image in the adjustment process, and the shooting interface is a black interface, a white interface, an interface in another preset color, or an interface with preset content. After determining that the shooting scenario is the starry-sky scenario, the mobile phone displays, on the shooting interface, a target photo with a relatively good effect obtained through shooting.

Figure 13:
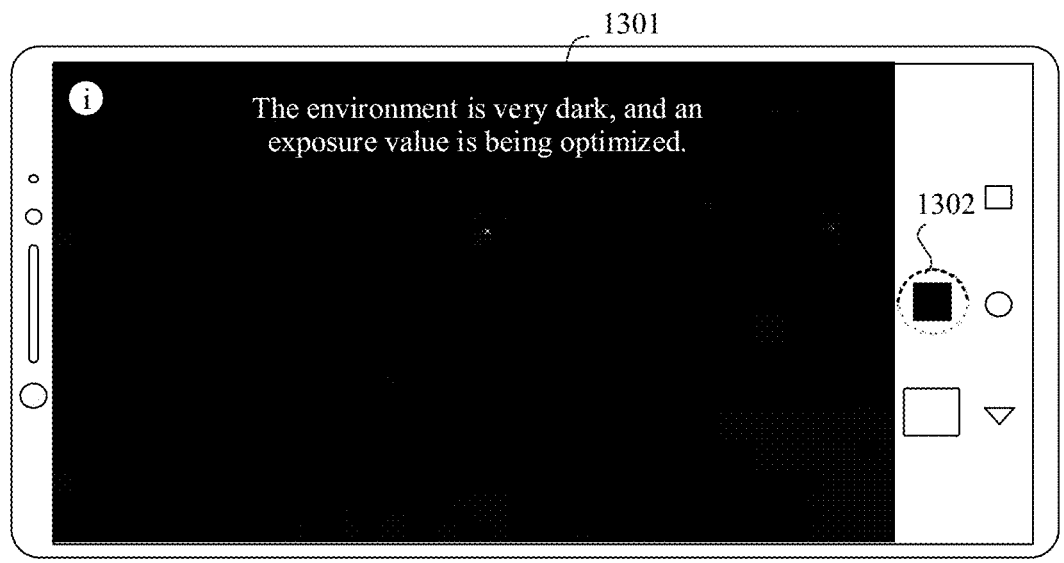
FIG. 13 is a schematic diagram of another interface according to an embodiment of this application.

In some embodiments, the mobile phone may further prompt the user in a manner such as interface display, a sound, a vibration, or an indicator in the adjustment process. This helps the user to learn of a current shooting status of the mobile phone, and prevents the user from being misled that the mobile phone cannot normally perform shooting. For example, the mobile phone may prompt the user that optimization processing is currently being performed or whether the starry-sky scenario is being identified. For example, for the shooting interface displayed by the mobile phone in the adjustment process, refer to FIG. 13. The mobile phone may display prompt information 1301 to prompt the user that "The environment is very dark, and an exposure value is being optimized". For another example, in the adjustment process, the mobile phone may display prompt information to prompt the user that "Current light is relatively dark, and whether a shooting scenario is a starry-sky scenario is being identified." It should be noted that, in the adjustment process shown in FIG. 13, because the shooting environment is very dark, a shot object such as a star is hardly visible on the shooting interface.

In some other embodiments, the shooting interface may further include a continuously rotated ring control 1302. The ring control 1302 is configured to prompt the user that the mobile phone is currently performing shooting processing, and no problem such as frame freezing occurs.

In some embodiments, in the adjustment process, the ring control may represent progress of the adjustment process. When the ring control forms a complete ring, the adjustment process is completed, the mobile phone obtains the target shooting parameter, and the mobile phone displays, on the shooting interface, the target photo obtained through shooting based on the target shooting parameter. For example, after the adjustment process is completed, for the shooting interface that is displayed by the mobile phone and that includes the target photo, refer to FIG. 14.

After the adjustment process is completed, if the low-light scenario is not the starry-sky scenario, the mobile phone may display, on the shooting interface, the image collected based on the preset frame rate and the display shooting parameter. After the adjustment process is completed, if the low-light scenario is the starry-sky scenario, the mobile phone may display, on the shooting interface, the target picture obtained through shooting based on the shooting parameter corresponding to the starry-sky scenario, to display an image picture with a relatively good effect to the user.

In some other embodiments, the shooting interface of the mobile phone may further include a first time control and a second time control. The first time control is used to indicate shooting duration of the time-lapse video, and the second time control is used to indicate playable duration of the time-lapse video generated after time-lapse shooting is stopped. The playable duration is associated with the shooting duration, the target shooting interval, and a video playback frame rate. For example, playable duration=shooting duration/(target shooting interval*video playback frame rate).

In the non-low-light scenario, the first time control is used to indicate shooting duration from a moment at which the user indicates to start time-lapse video shooting to a current moment. In the low-light scenario, the first time control is used to indicate shooting duration from a moment at which the mobile phone completes an adjustment process to a current moment.

For example, in the non-low-light scenario, the first time control on the shooting interface may be a control 1201 shown in FIG. 12(*a*), and the second time control may be a control 1202 shown FIG. 12(*b*). For example, in the low-light scenario, the first time control on the shooting interface may be a control 1401 shown in FIG. 14, and the second time control may be a control 1402 shown FIG. 14.

In some other embodiments, the shooting interface may further include a pause control. After detecting an operation that the user taps the pause control, the mobile phone may pause time-lapse shooting. Then, a shooting control is displayed on the shooting interface. After detecting an operation that the user taps the shooting control on the shooting interface, the mobile phone continues time-lapse shooting.

213: The mobile phone performs video coding on the target photo obtained through shooting.

In some embodiments, the mobile phone may perform, by grouping M (positive integers) photos, video coding on the plurality of target photos obtained through shooting. In this way, after detecting an operation that the user indicates to complete shooting, the mobile phone may quickly complete video coding on the target photo, to quickly generate the time-lapse video.

In some other embodiments, after detecting an operation that the user indicates to stop time-lapse video shooting, the mobile phone may perform video coding on the target photo obtained through shooting, to generate the time-lapse video.

214: After detecting the operation that the user indicates to stop time-lapse video shooting, the mobile phone generates the time-lapse video based on a coded target photo.

Figure 14:
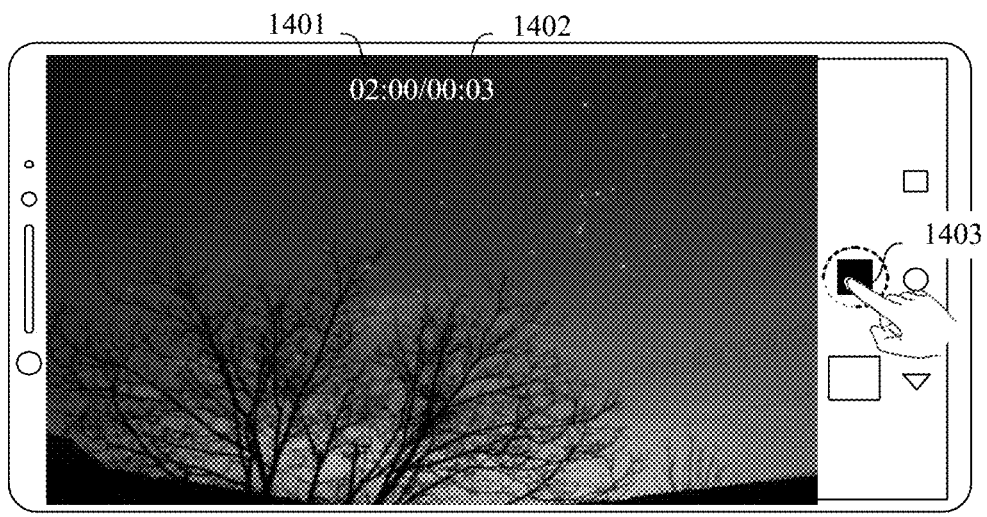
FIG. 14 is a schematic diagram of another interface according to an embodiment of this application.

The user may indicate, in a plurality of manners, for example, by performing a touch operation, a button operation, an air gesture operation, or a voice operation, the mobile phone to stop time-lapse video shooting. For example, as shown in FIG. 14, after detecting an operation that the user taps a shooting stop control 1403, the mobile phone may stop time-lapse shooting.

Figure 15:
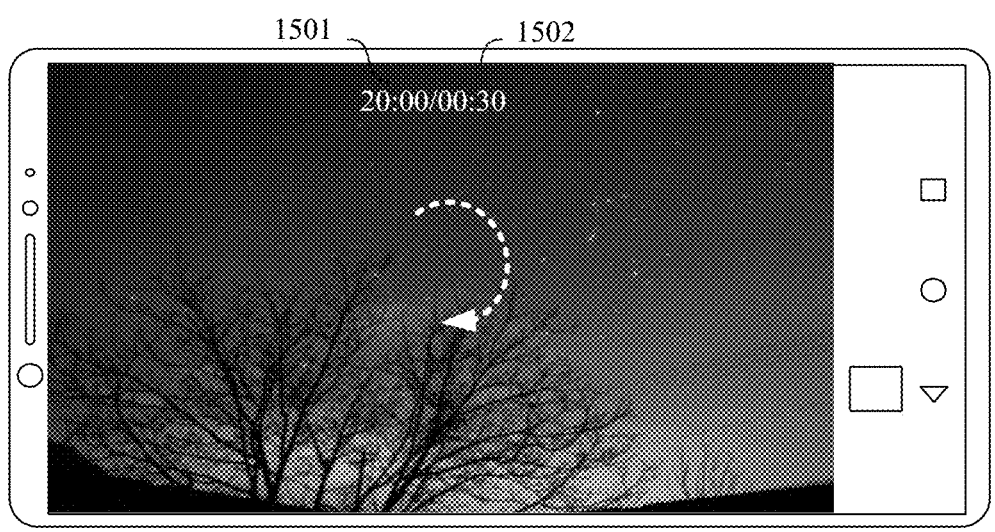
FIG. 15 is a schematic diagram of another interface according to an embodiment of this application.

A processing time from a moment at which the mobile phone detects the operation that the user indicates to stop time-lapse shooting to a moment at which the mobile phone generates the time-lapse video may be required. For example, after detecting the operation that the user indicates to stop time-lapse shooting, the mobile phone may display a transition interface for generating the time-lapse video shown in FIG. 15. In a case shown in FIG. 15, time-lapse video shooting duration represented by a first control 1501 is 20 min, and time-lapse video playable duration represented by a second control 1502 is 30 s.

Figure 16:
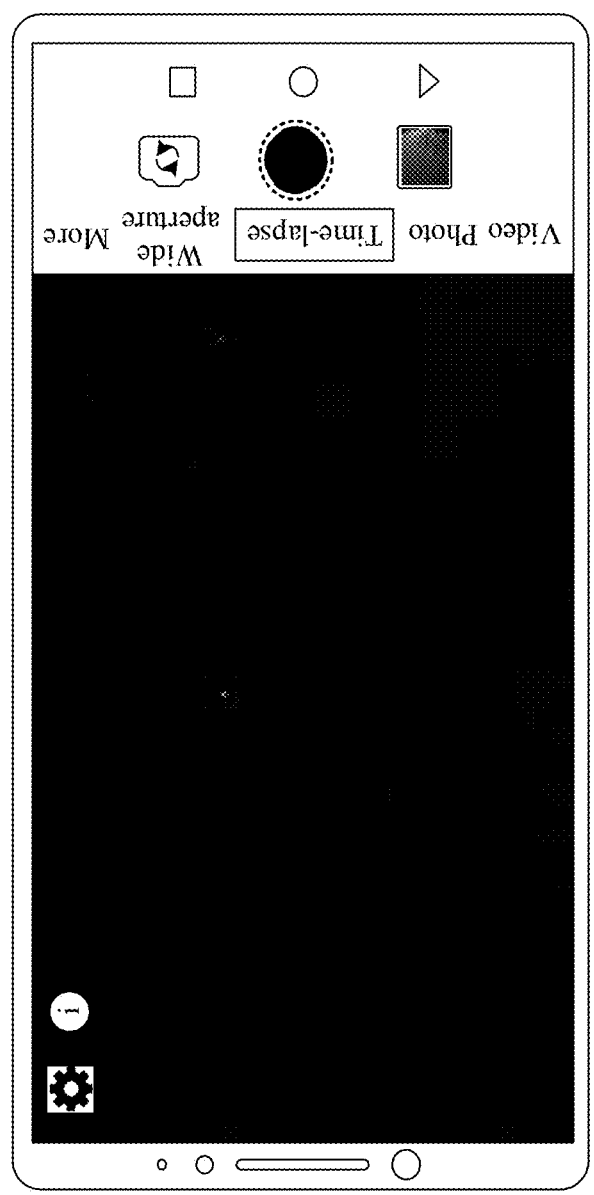
FIG. 16 is a schematic diagram of another interface according to an embodiment of this application.

After generating the time-lapse video, the mobile phone may display a thumbnail of the time-lapse video, return to a preview state, and display a preview interface. For example, for an interface displayed after the mobile phone generates the time-lapse video, refer to FIG. 16.

In some embodiments, after the mobile phone just ends time-lapse shooting, the shooting scenario may not change. Therefore, the mobile phone may first detect whether the current shooting scenario is the shooting scenario just used. This improves a shooting scenario identification speed.

Figure 17:
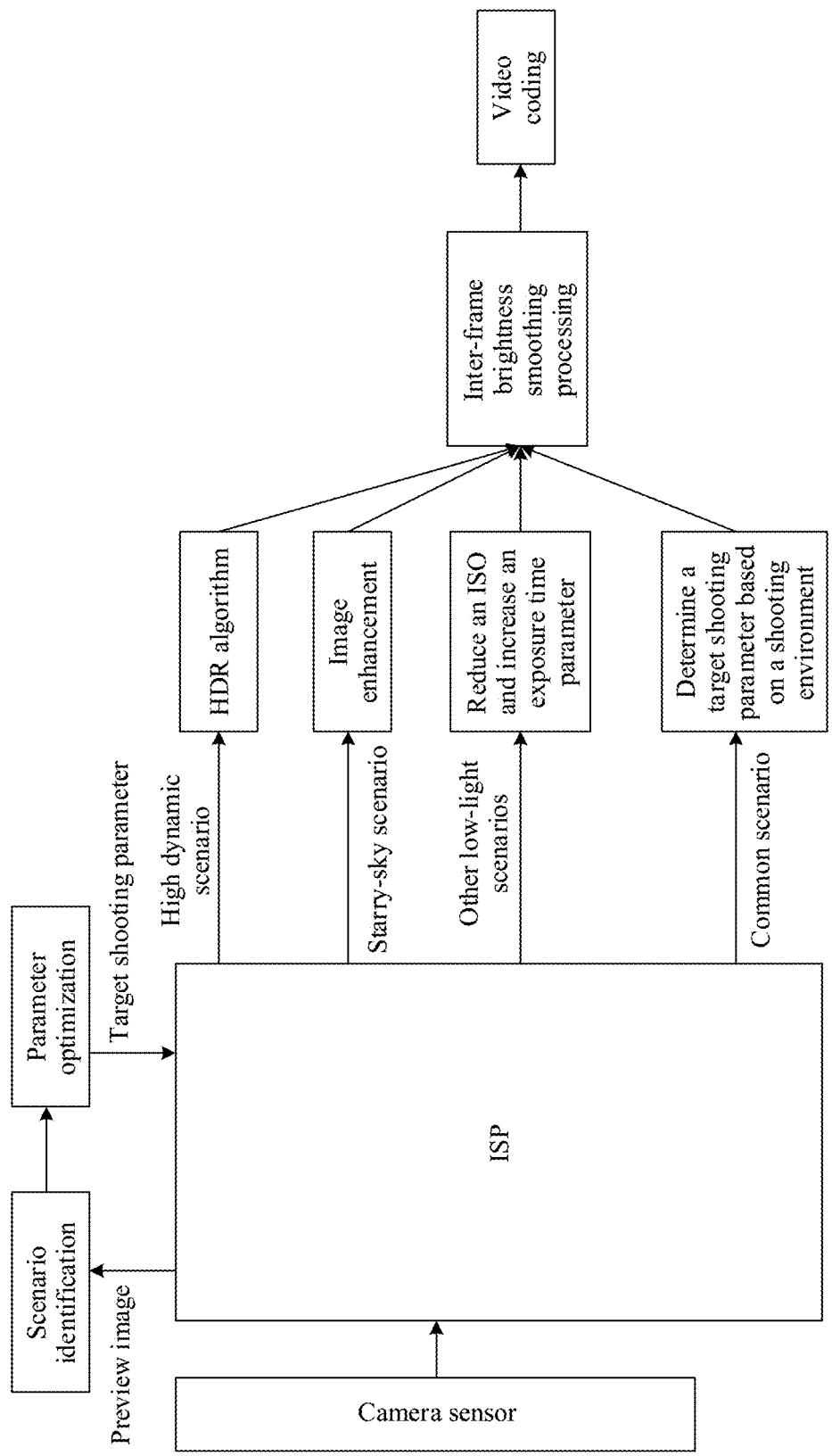
FIG. 17 is a flowchart of time-lapse processing according to an embodiment of this application.

It can be learned from the foregoing descriptions that, in the solution described in operation 201 to operation 214, as shown in FIG. 17, the mobile phone may identify the shooting scenario based on the preview image, determine the target shooting parameter based on the shooting scenario, and obtain the target photo through shooting based on the target shooting parameter. The mobile phone may separately perform shooting processing for different shooting scenarios in a matched processing manner. In the high dynamic scenario, the mobile phone may use the HDR algorithm to obtain the target photo. In the starry-star scenario, the mobile phone may perform image enhancement on the target photo obtained through shooting. In another low-light scenario other than the starry-star scenario, the mobile phone may reduce the ISO and increase the exposure time parameter. In the common scenario, the mobile phone may determine the target shooting parameter based on the shooting environment, and obtain the target photo through shooting based on the target shooting parameter. Then, the mobile phone may perform video coding on the previously obtained target photo, to generate the time-lapse video.

In other words, in the solution described in operation 201 to operation 214, in the time-lapse mode, the electronic device may automatically detect a current shooting scenario; determine a target shooting parameter that matches the current shooting scenario and a target shooting interval that matches a shot object, to obtain a plurality of photos with a relatively good effect through shooting based on the target shooting parameter and the target shooting interval; and perform video coding on the plurality of photos to generate a time-lapse video. Therefore, time-lapse shooting can be performed adaptively in different shooting scenarios, so that an effect of a time-lapse video obtained through shooting is relatively good.

It should be noted that, in some other embodiments, some operations in operation 201 to operation 214 are optional, and the mobile phone may not perform these operations in a time-lapse shooting process. For example, in some embodiments, when the shooting scenario is not the starry-sky scenario, the mobile phone may not perform operation 210 and not perform post-processing on the target photo obtained through shooting. For another example, in some other embodiments, the mobile phone may not perform operation 211, but directly performs video coding on the target photo on which inter-frame brightness smoothing processing is not performed.

In some other embodiments, in the preview state, after the mobile phone determines the target shooting parameter corresponding to the shooting scenario, the mobile phone may display, on the preview interface, the image obtained by the mobile phone through shooting based on the target shooting parameter, so as to display the preview image with a relatively good effect to the user.

Figure 18:
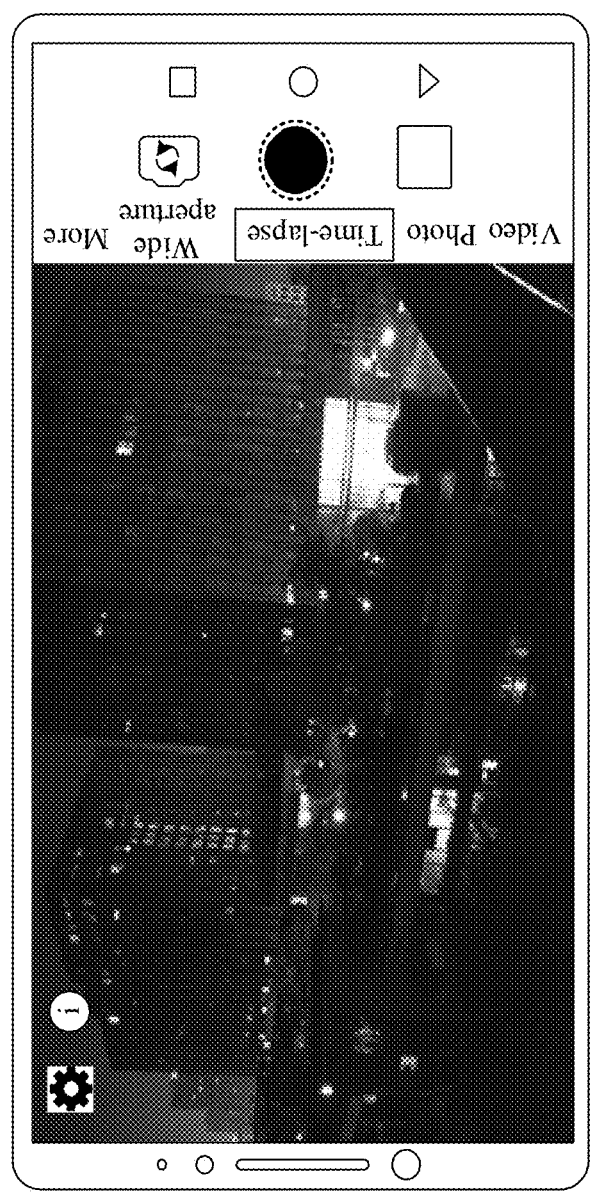
FIG. 18 is a schematic diagram of another interface according to an embodiment of this application.

In some other embodiments, in the preview state, after the mobile phone determines the target shooting parameter, if the current shooting scenario is the low-light scenario, the mobile phone may obtain an image through shooting based on the target shooting parameter that is determined by the parameter optimization module and that has a relatively large exposure time parameter, and display the image on the preview interface. For example, in the low-light scenario, if a preview interface displayed before adjustment is shown in FIG. 7(a), a preview interface displayed after adjustment may be shown in FIG. 18. In the preview state of the low-light scenario, because the exposure time parameter in the target shooting parameter is increased, and the target shooting interval is also greater than the previous preview frame rate, the preview frame rate may also be correspondingly reduced. For example, the preview frame rate may be reduced from 30 fps to 12 fps (which may be the same as or different from the frame rate 1). If the current shooting scenario is the non-low-light scenario, the mobile phone collects the image based on the preview frame rate and the preview shooting parameter, and displays the image on the preview interface. In this way, in the low-light scenario, the mobile phone may reduce image noise in a low-light condition, improve image quality of a preview image, and present an image picture with a relatively good effect to the user. In the non-low-light scenario, the mobile phone may display smooth preview content to the user in real time by using a relatively high preview frame rate.

In addition, in some other embodiments of this application, the time-lapse mode includes an automatic mode and a manual mode, and the mobile phone may prompt, on the preview interface, the user whether a current mode is the automatic mode or the manual mode. In addition, the automatic mode and the manual mode may be switched between each other. In the automatic mode, the mobile phone may automatically perform time-lapse shooting by using the process described in the foregoing embodiment. In the manual mode, the user may actively set one or more of parameters such as a shooting scenario, a target shooting interval, shooting duration, video duration, an ISO in a target shooting parameter, an exposure time parameter in the target shooting parameter, a focus mode, or white balance. The mobile phone may perform time-lapse video shooting based on the parameter that is actively set by the user. In the manual mode, the mobile phone may display parameter setting information on the preview interface, to help professionals to shoot a time-lapse video with an ideal effect by using a non-professional camera such as the mobile phone.

In some embodiments, in the time-lapse mode, the mobile phone may be in the automatic mode by default, and the mobile phone may switch to the manual mode based on a user instruction.

Figure 19:
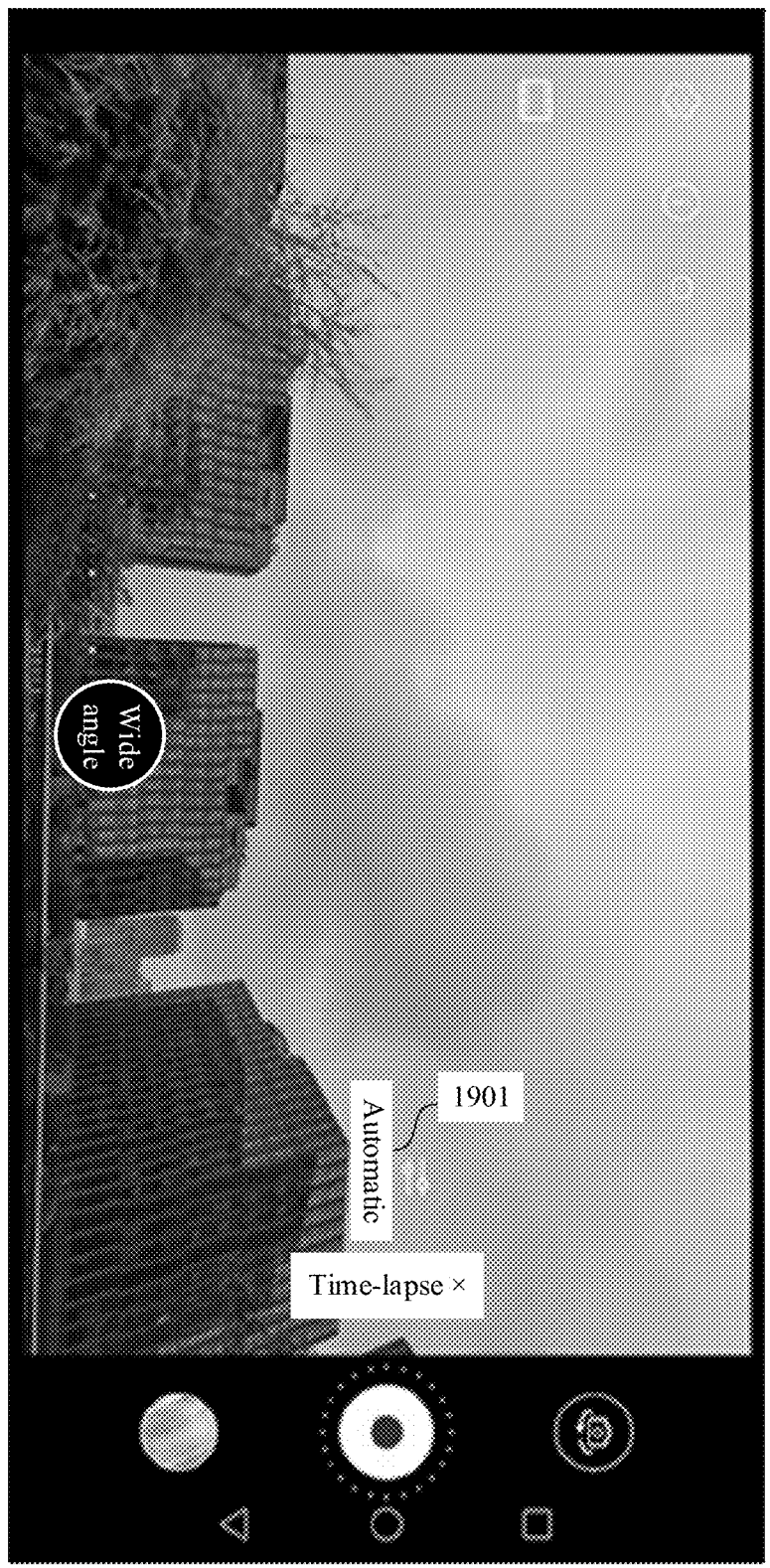
FIG. 19 is a schematic diagram of another interface according to an embodiment of this application.

In some other embodiments, the preview interface of the time-lapse mode may include a mode control used to switch between the automatic mode and the manual mode. For example, the mode control may be a control 1901 shown in FIG. 19. In a case shown in FIG. 19, the control 1901 indicates that the current mode is the automatic mode. After detecting an operation that the user taps the control 1901, the mobile phone may switch to the manual mode, and display related information corresponding to the manual mode on the preview interface.

Figure 20A:
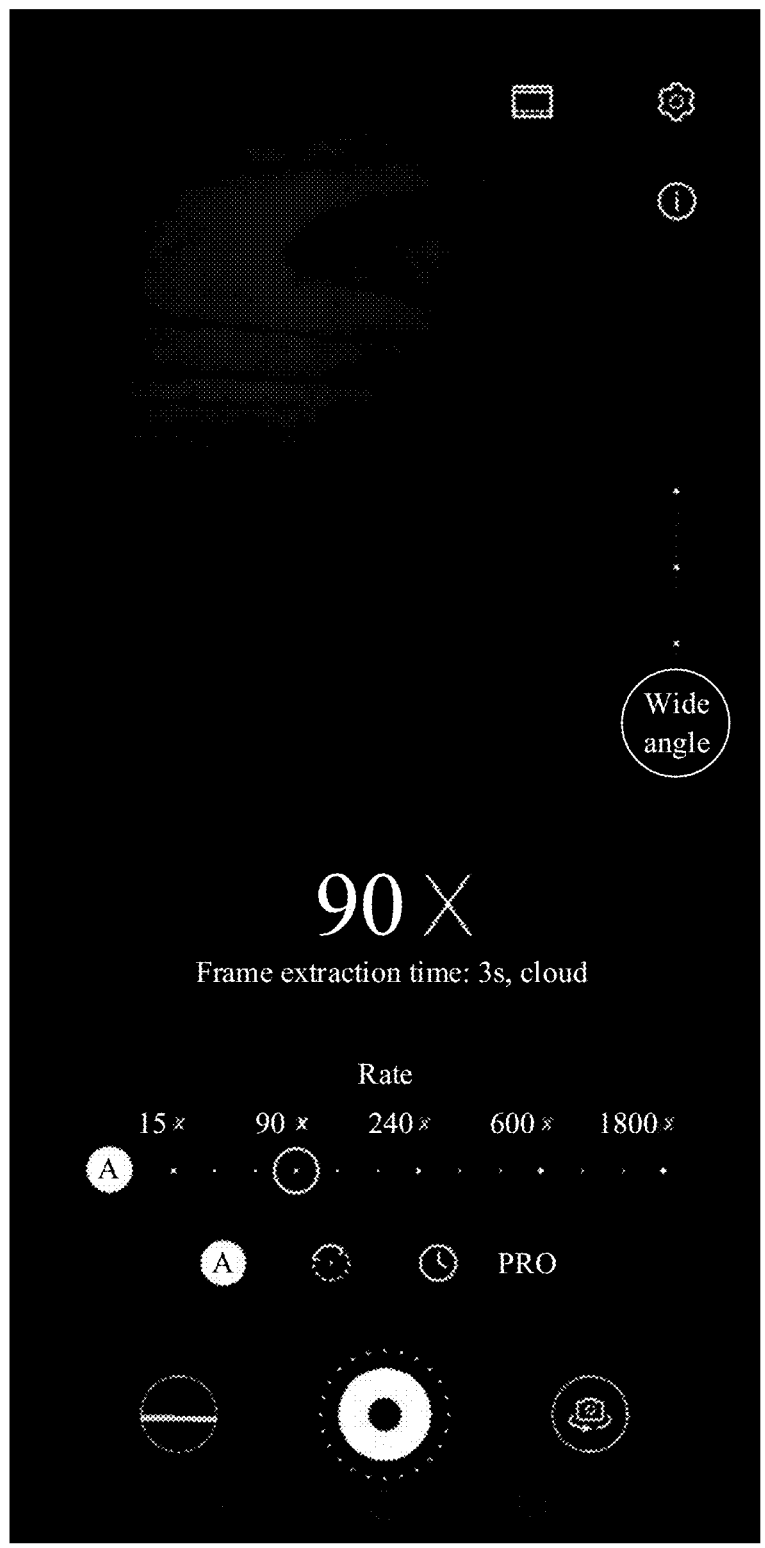
FIG. 20(a) to FIG. 20(c) are schematic diagrams of another group of interfaces according to an embodiment of this application.

For example, in the manual mode, for a preview interface used to help the user to set a shooting interval, refer to FIG. 20(a). It should be noted that a processing time for obtaining one target photo through shooting by using the HDR algorithm is relatively long, for example, at least duration T (for example, 2.35 s). Therefore, in the automatic mode of the high dynamic scenario, if a target shooting interval that is manually set by the user is less than T, the mobile phone exits the high dynamic scenario, and performs time-lapse video shooting by using the common scenario.

Figure 20B:
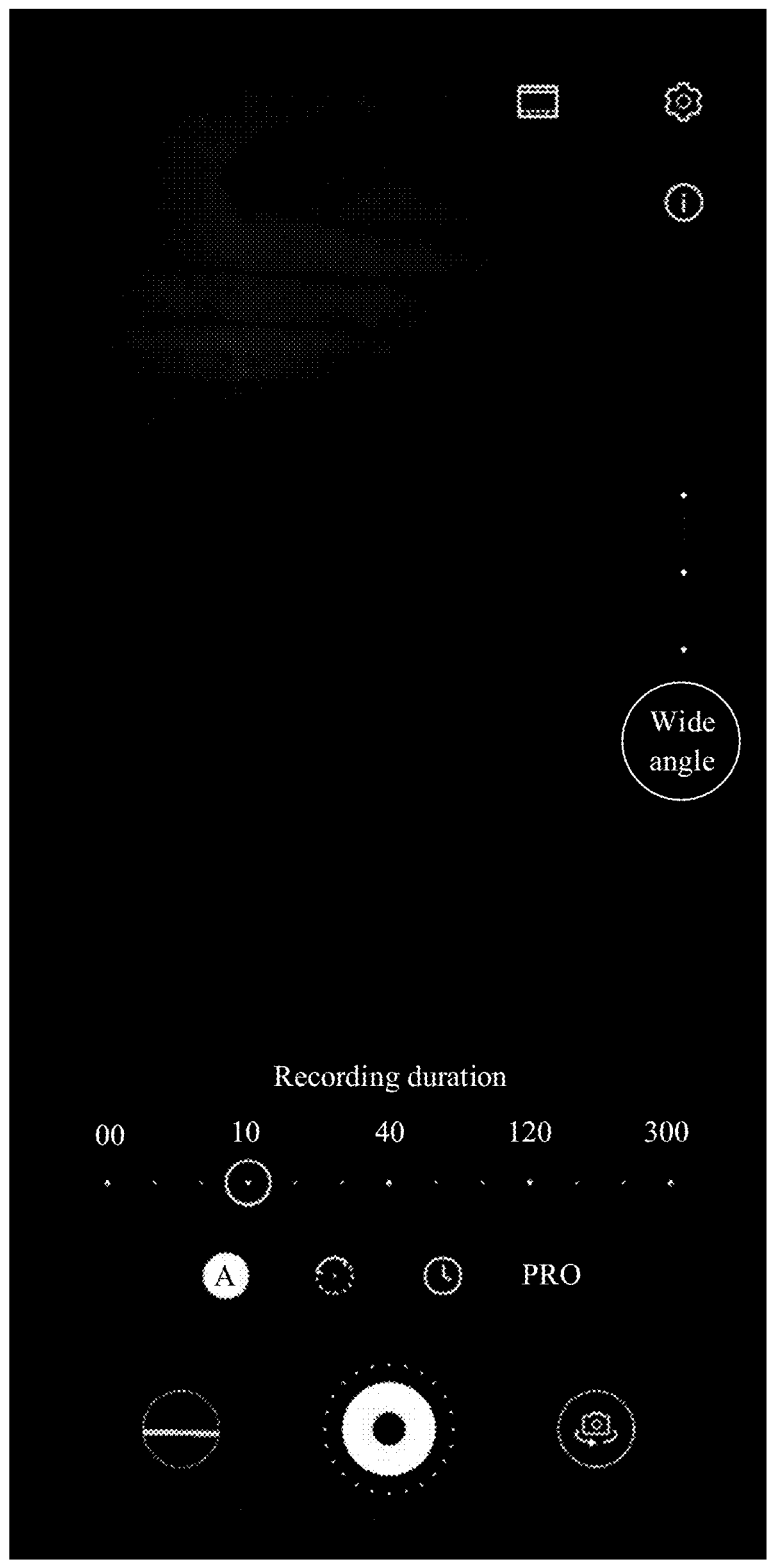

For example, in the manual mode, for a preview interface used to help the user to set shooting duration (or referred to as recording duration), refer to FIG. 20(b).

Figure 20C:
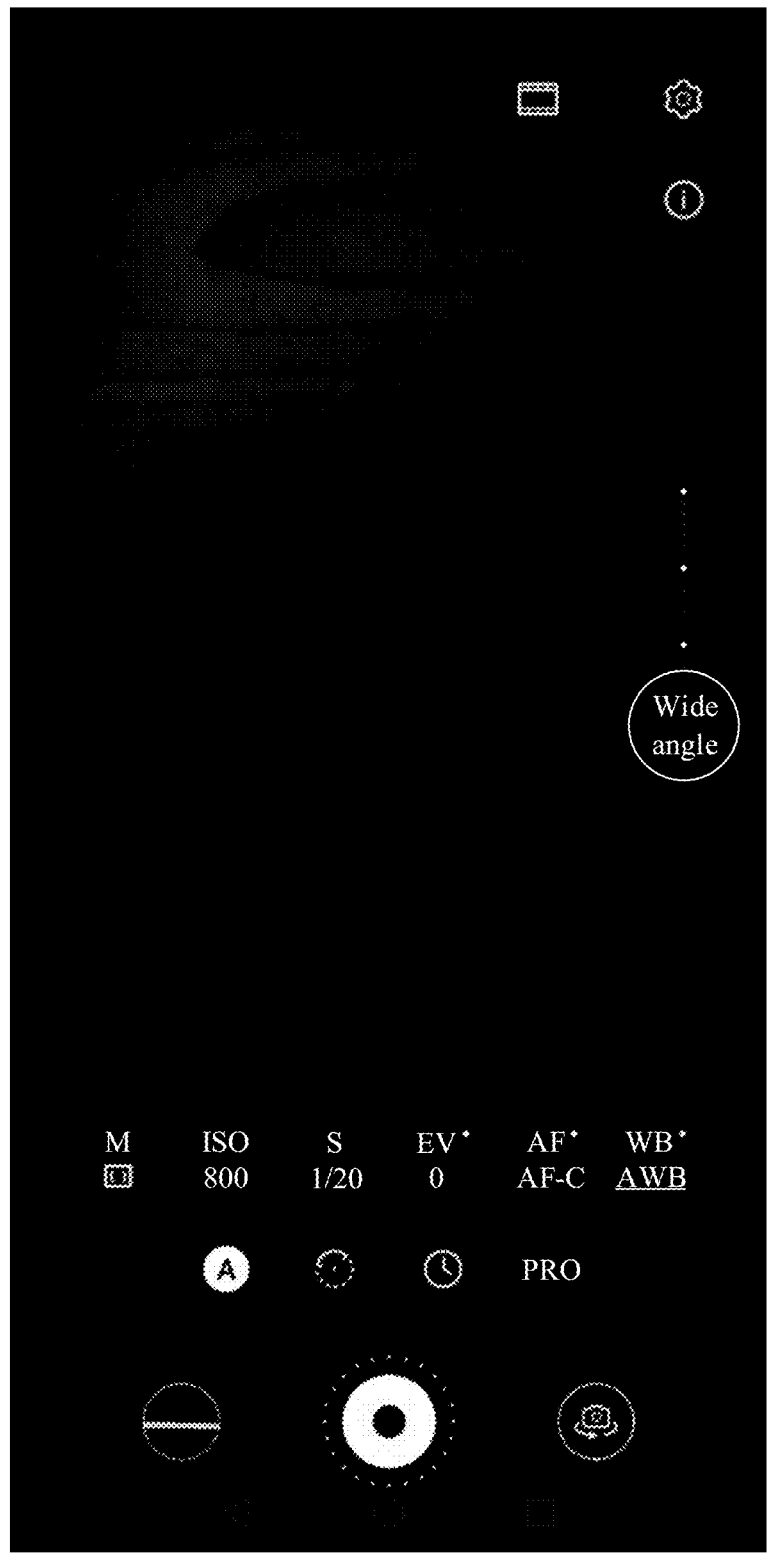

For example, in the manual mode, for a preview interface used to help the user to set a shooting parameter such as an ISO or an exposure time parameter, refer to FIG. 20(c).

In some other embodiments, after detecting an operation that the user touches and holds the "Time-lapse" control 306 on the preview interface shown in FIG. 3(b), the mobile phone displays a mode list from which the user can select the automatic mode or the manual mode, and switches the time-lapse mode based on the user instruction.

In some other embodiments, after detecting an operation that the user taps a "Settings" icon 307 on the preview interface shown in FIG. 3(b), the mobile phone displays a mode list from which the user can select the automatic mode or the manual mode, and switches the time-lapse mode based on the user instruction.

In some other embodiments, after detecting that the user touches and holds the control 601 on the preview interface shown in FIG. 6(a), the mobile phone displays a list of shooting scenarios that can be selected by the user, and performs time-lapse shooting based on a shooting scenario indicated by the user. For example, the mobile phone may determine a target shooting parameter based on the shooting scenario indicated by the user, to perform shooting based on the target shooting parameter.

In addition, in some embodiments of this application, after detecting that the user taps the control 601 on the preview interface shown in FIG. 6(a), the mobile phone may display the target shooting parameter that corresponds to the high dynamic scenario and that is determined by the mobile phone.

In the time-lapse process, a shooting time of the electronic device such as the mobile phone is usually relatively long. Therefore, to ensure shooting quality and prevent image flickering, the electronic device such as the mobile phone may be fixed (for example, may be fixed by using a tripod) before shooting.

In addition, the mobile phone may record a shooting parameter change by using a log. For example, for a screenshot of a corresponding log in the starry-sky scenario, refer to FIG. 21. That ISO=5437 and exposure time parameter=24999 at a position identified by a first arrow may be preview shooting parameters, and that ISO=804 and exposure time parameter=50536 at a position identified by a second arrow may be target shooting parameters.

In some other embodiments, the mobile phone may further store, as a photo, the target photo obtained through shooting in the time-lapse mode. For example, the shooting interface may include a photo storage control. After detecting an operation that the user taps the control, the mobile phone may store, as a photo, the target photo currently obtained through shooting, so that not only a time-lapse video with a relatively good effect but also a photo with a relatively good effect can be obtained in the current shooting scenario. For another example, after generating the time-lapse video, the mobile phone stores a video file and a picture file of the target photo.

In addition, in this embodiment of this application, in a process in which the mobile phone performs time-lapse video shooting, when a target photo is obtained through shooting, a log may record a keyword 1, and the keyword 1 is used to indicate a shooting operation. In the conventional technology, in a process of obtaining a time-lapse video by performing video shooting and frame extraction, when video shooting is performed, a keyword 2 may be recorded in a log, and the keyword 2 is used to indicate a video shooting operation.

The foregoing is mainly described by using an example in which the electronic device is a mobile phone. The time-lapse shooting method provided in this embodiment of this application may be further applied to another electronic device such as a tablet computer. Details are not described herein again.

In some other embodiments, the method for determining a shooting scenario and a target shooting parameter provided in the foregoing embodiment may be further applied to another shooting mode other than the time-lapse mode. For example, in the photo mode, the electronic device may determine, by using the method described in the foregoing embodiment, a shooting scenario and a target shooting parameter that matches the shooting scenario; and then obtain one or more photos with effect interaction in the current shooting scenario through shooting based on the target shooting parameter that matches the shooting scenario.

It may be understood that, to implement the foregoing functions, the electronic device includes corresponding hardware and/or software modules for performing the functions. With reference to algorithm operations of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, function modules of the electronic device may be obtained through division based on the foregoing method examples. For example, the function modules may be obtained through division based on the functions, or two or more functions may be integrated into one processing module. The integrated module may be implemented in a form of hardware. It should be noted that the module division in the embodiments is an example, and is merely logical function division. During actual implementation, another division manner may be used.

Figures 21, 22:
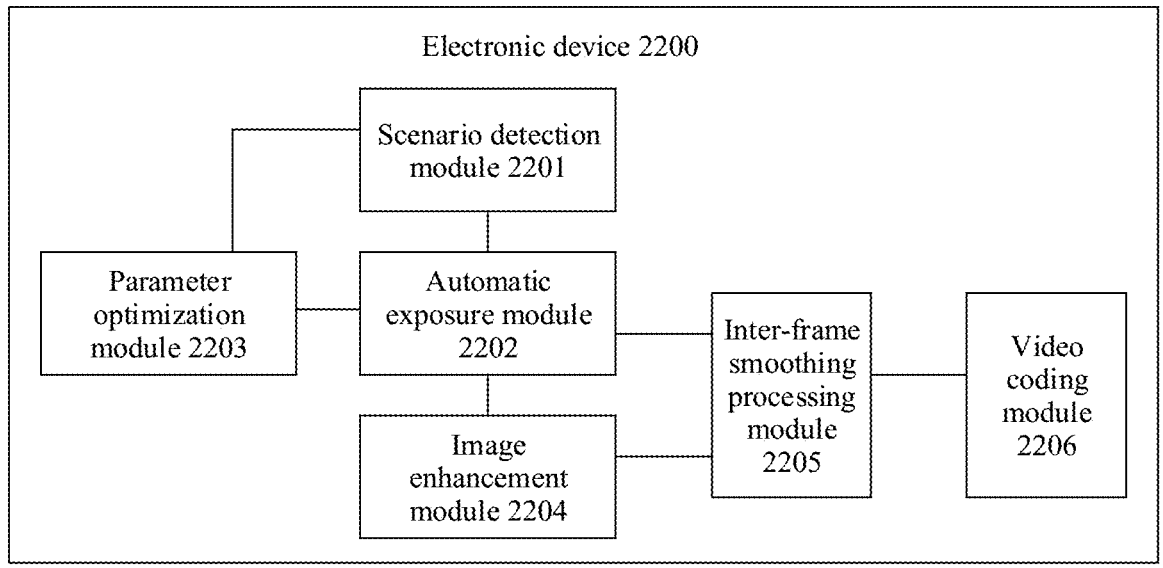
FIG. 21 is a screenshot of a log according to an embodiment of this application.
FIG. 22 is a schematic diagram of a module of an electronic device according to an embodiment of this application.

When each function module is obtained through division based on each function, FIG. 22 is a possible schematic composition diagram of the electronic device 2200 in the foregoing embodiments. As shown in FIG. 22, the electronic device may include a scenario detection module 2201, an automatic exposure module 2202, a parameter optimization module 2203, an image enhancement module 2204, an inter-frame brightness smoothing processing module 2205, a video coding module 2206, and the like.

The scenario detection module 2201 may be configured to support the electronic device in performing a function of detecting a current shooting scenario in operation 203, a function of determining a starry-sky scenario in operation 207, and the like; and/or configured to perform other processes of the technologies described in this specification.

The automatic exposure module 2202 may be configured to support the electronic device in determining a preview shooting parameter and a display shooting parameter based on a shooting environment, so that the electronic device collects an image based on the preview shooting parameter or the display shooting parameter, and therefore displays a preview image in operation 201, and displays an image on a shooting interface in operation 212; and/or configured to perform other processes of the technologies described in this specification.

The parameter optimization module 2203 may be configured to support the electronic device in optimizing and determining a target shooting parameter in operation 205 and operation 208; and/or configured to perform other processes of the technologies described in this specification.

The image enhancement module 2204 may be configured to support the electronic device in performing image enhancement on a target photo in a starry-sky scenario in operation 210; and/or configured to perform other processes of the technologies described in this specification.

The inter-frame brightness smoothing processing module 2205 may be configured to support the electronic device in performing inter-frame brightness smoothing processing on adjacent target photos in operation 211; and/or configured to perform other processes of the technologies described in this specification.

The video coding module 2206 may be configured to support the electronic device in performing video coding on a target photo in operation 213; and/or configured to perform other processes of the technologies described in this specification.

The scenario detection module 2201, the automatic exposure module 2202, the parameter optimization module 2203, the image enhancement module 2204, and the inter-frame brightness smoothing processing module 2205 may be software modules in the electronic device. The video coding module 2206 may be a hardware module in the electronic device.

A software system of the electronic device may use a layered architecture, an event-driven architecture, a microkernel architecture, a micro service architecture, or a cloud architecture. In an embodiment of this application, an Android system with a layered architecture is used as an example to describe a software structure of the electronic device.

Figure 23:
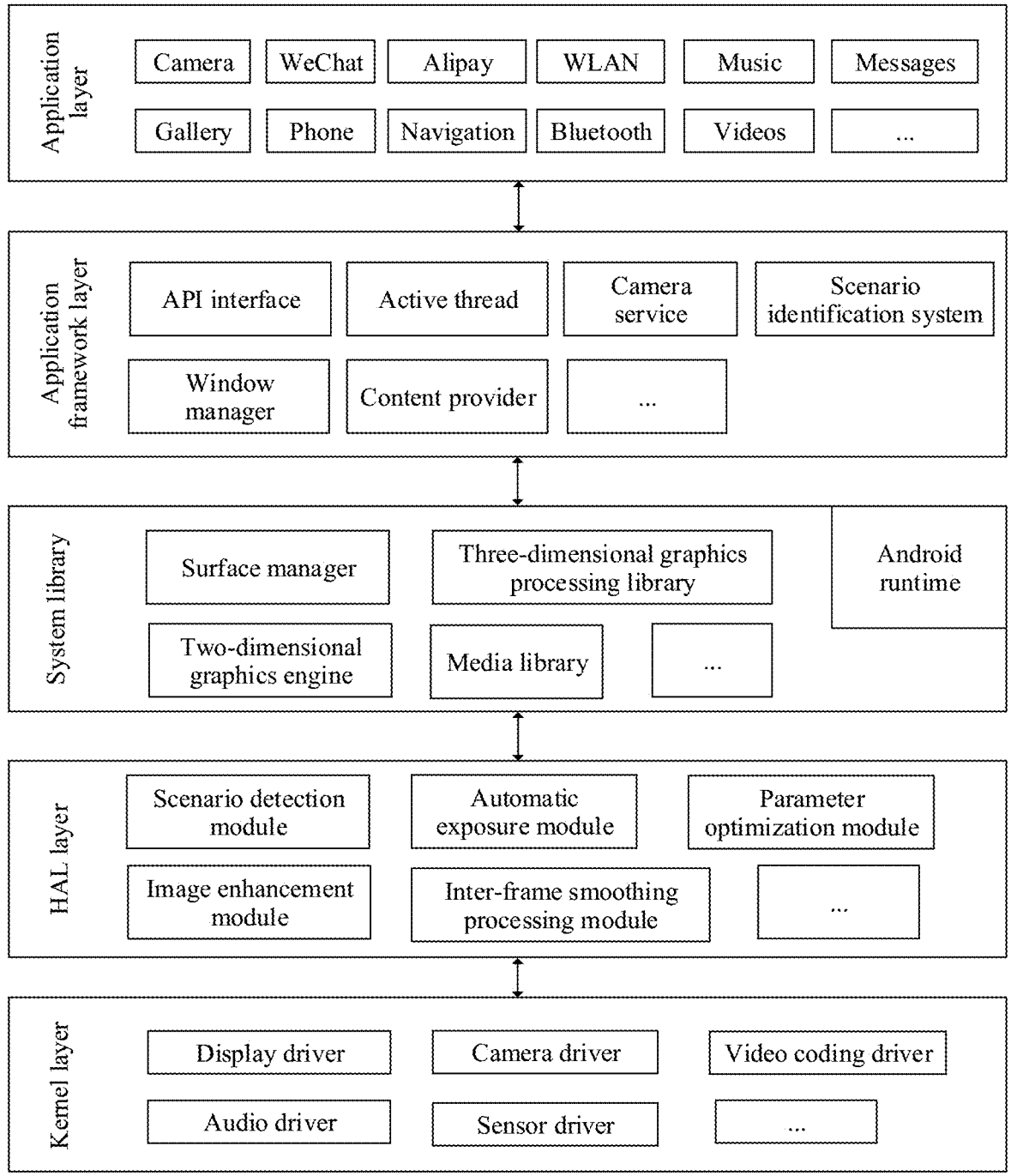
FIG. 23 is a schematic diagram of a software architecture of an electronic device according to an embodiment of this application.

FIG. 23 is a block diagram of the software structure of the electronic device according to an embodiment of this application. In the layered architecture, software is divided into several layers, and each layer has a clear role and task. The layers communicate with each other through a software interface. In some embodiments, an Android system is divided into four layers: an application layer, an application framework layer, an Android runtime and system library, and a HAL layer and kernel layer from top to bottom. The application layer may include a series of application packages.

As shown in FIG. 23, the application packages may include applications such as Camera, Gallery, Calendar, Phone, Map, Navigation, WLAN, Bluetooth, Music, Videos, and Messages. Camera may provide a time-lapse shooting function.

The application framework layer provides an application programming interface (API) and a programming framework for an application at the application layer. The application framework layer includes some predefined functions.

As shown in FIG. 23, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a bookmark, a phone book, and the like.

The view system includes visual controls, such as a control for displaying a text and a control for displaying a picture. The view system may be configured to construct an application. A display interface may include one or more views. For example, a display interface including a notification icon of Messages may include a text display view and a picture display view.

The phone manager is configured to provide a communication function of the electronic device, for example, management of a call status (including answering, declining, or the like).

The resource manager provides various resources for an application, such as a localized character string, an icon, a picture, a layout file, and a video file.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is prompted in the status bar, an alert sound is played, the electronic device vibrates, or an indicator light blinks.

The Android runtime includes a kernel library and a virtual machine. The Android runtime is responsible for scheduling and management of the Android system.

The kernel library includes two parts: a function that may be invoked in Java language and a kernel library of Android.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The HAL layer is used to abstract underlying hardware to provide abstracted services and functions such as cameras, audio, and Bluetooth for the upper layer. The scenario detection module 2201, the automatic exposure module 2202, the parameter optimization module 2203, the image enhancement module 2204, and the inter-frame brightness smoothing processing module 2205 shown in FIG. 22 may be located at the HAL layer.

The kernel layer is a layer between hardware and software. The kernel layer includes at least a display driver, a camera driver, an audio driver, a sensor driver, a video codec driver, and the like.

In addition, an embodiment of this application further provides an electronic device. The electronic device includes: a camera, configured to collect an image; a screen, configured to display an interface; one or more processors; a memory; and one or more computer programs. The one or more computer programs are stored in the memory, and the one or more computer programs include instructions. When the instructions are executed by the one or more processors, the electronic device is enabled to perform the operations in the foregoing embodiment to implement the foregoing time-lapse shooting method.

An embodiment of this application further provides a computer storage medium. The computer storage medium stores computer instructions. When the computer instructions are run on an electronic device, the electronic device is enabled to perform the related method operations to implement the time-lapse shooting method in the foregoing embodiment.

An embodiment of this application further provides a computer program product. When the computer program product runs on a computer, the computer is enabled to perform the related operations to implement the time-lapse shooting method in the foregoing embodiment.

In addition, an embodiment of this application further provides an apparatus. The apparatus may be a chip, a component, or a module. The apparatus may include a processor and a memory that are connected. The memory is configured to store computer-executable instructions, and when the apparatus runs, the processor may execute the computer-executable instructions stored in the memory, so that the chip performs the time-lapse shooting method performed by the electronic device in the foregoing method embodiment.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may understand that, for the purpose of convenient and brief descriptions, division into the foregoing function modules is merely used as an example for description. During actual application, the foregoing functions can be allocated to different function modules for implementation according to a requirement, in other words, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, in other words, may be located in one place, or may be distributed on a plurality of different places. Some or all of the units may be selected according to actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the operations of the methods described in the embodiments of this application. The foregoing storage medium includes any medium that can store program code, such as a USB flash drive, a removable hard disk, a read only memory (ROM), a random access memory (RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A time-lapse shooting method, comprising:
after detecting a first operation that a user indicates to operate a camera function of an electronic device, starting, by the electronic device, the camera function;
after detecting a second operation that the user indicates to enter a time-lapse mode, entering, by the electronic device, the time-lapse mode, and displaying a preview interface, wherein the preview interface comprises a first preview image that is collected based on a first frame rate and a first shooting parameter;
identifying, by the electronic device, a shooting scenario based on the first preview image, wherein the shooting scenario comprises a high dynamic scenario, a low-light scenario, or a common scenario;
determining, by the electronic device, a target shooting parameter based on the shooting scenario, wherein the target shooting parameter comprises a target photosensitivity ISO and a target exposure time parameter;
after detecting a third operation that the user indicates to start shooting, obtaining, by the electronic device, a plurality of target photos through shooting based on the target shooting parameter;
if the electronic device identifies that the shooting scenario is the high dynamic scenario or the common scenario, collecting, by the electronic device, a display image based on the first frame rate and the first shooting parameter;
displaying, by the electronic device, a shooting interface comprising the display image; and
after detecting a fourth operation that the user indicates to stop shooting, generating, by the electronic device, a time-lapse video based on the plurality of target photos.

2. The method according to claim 1, wherein after the identifying, by the electronic device, the shooting scenario based on the first preview image, the method further comprises:
displaying, by the electronic device, first prompt information on the preview interface, wherein the first prompt information is used to prompt the shooting scenario identified by the electronic device.

3. The method according to claim 1, wherein after the entering, by the electronic device, the time-lapse mode, and displaying the preview interface, wherein the preview interface comprises the first preview image, the method further comprises:
determining, by the electronic device, a target shooting interval based on a shot object on the first preview image, and
wherein the obtaining, by the electronic device, the plurality of target photos through shooting based on the target shooting parameter comprises:
obtaining, by the electronic device, the plurality of target photos through shooting based on the target shooting parameter and the target shooting interval.

4. The method according to claim 3, wherein if the electronic device identifies that the shooting scenario is the high dynamic scenario, the target shooting parameter corresponding to the high dynamic scenario comprises a plurality of exposure time parameters;
and the obtaining, by the electronic device, the plurality of target photos through shooting based on the target shooting parameter and the target shooting interval comprises:
obtaining, by the electronic device, one group of multi-frame images with different exposure degrees through shooting based on the plurality of exposure time parameters;

obtaining, by the electronic device, a plurality of groups of images through shooting based on the target shooting interval; and fusing, by the electronic device, each group of multi-frame images into one target photo.

5. The method according to claim 3, wherein if the electronic device identifies that the shooting scenario is the low-light scenario, the obtaining, by the electronic device, the plurality of target photos through shooting based on the target shooting parameter and the target shooting interval comprises:

if the electronic device identifies that the shooting scenario is a starry-sky scenario in the low-light scenario, determining, by the electronic device, the target shooting parameter and the target shooting interval corresponding to the starry-sky scenario; and obtaining, by the electronic device, the plurality of target photos through shooting based on the target shooting parameter and the target shooting interval corresponding to the starry-sky scenario; or if the electronic device identifies that the shooting scenario is not the starry-sky scenario, obtaining, by the electronic device, the plurality of target photos through shooting based on the target shooting parameter and the target shooting interval corresponding to the low-light scenario.

6. The method according to claim 5, wherein after the obtaining, by the electronic device, the plurality of target photos through shooting based on the target shooting parameter and the target shooting interval corresponding to the starry-sky scenario, the method further comprises:

performing, by the electronic device, image enhancement on the plurality of target photos.

7. The method according to claim 5, wherein if the electronic device identifies that the shooting scenario is the low-light scenario, after the electronic device detects the third operation that the user indicates to start time-lapse video shooting, the method further comprises:

collecting, by the electronic device, a target image based on the target shooting parameter corresponding to the low-light scenario and a second frame rate, wherein the shooting interface comprises the target image, wherein the shooting interface further comprises second prompt information, and the second prompt information is used to prompt the user that the electronic device is performing optimization processing or the electronic device is identifying whether the shooting scenario is the starry-sky scenario.

8. The method according to claim 7, wherein after the displaying, by the electronic device, the shooting interface, wherein the shooting interface comprises the target image, the method further comprises:

if the electronic device identifies that the shooting scenario is the starry-sky scenario in the low-light scenario, switching, by the electronic device, the target image on the shooting interface to one of the plurality of target photos obtained through shooting based on the target shooting parameter and the target shooting interval corresponding to the starry-sky scenario.

9. The method according to claim 8, wherein if the electronic device identifies that the shooting scenario is the starry-sky scenario in the low-light scenario, or if the electronic device identifies that the shooting scenario is not the starry-sky scenario, the method further comprises:

stopping, by the electronic device, displaying the second prompt information on the shooting interface; and displaying, by the electronic device, a first time control and a second time control on the shooting interface, wherein the first time control is used to indicate a shooting duration of the time-lapse video, and the second time control is used to indicate a playable duration of the time-lapse video.

10. The method according to claim 1, wherein the collecting, if the electronic device identifies that the shooting scenario is the high dynamic scenario or the common scenario, the display image based on the first frame rate and the first shooting parameter is performed after the electronic device detects the third operation that the user indicates to start time-lapse video shooting.

11. The method according to claim 10, wherein the shooting interface further comprises a first time control and a second time control, the first time control is used to indicate a shooting duration of the time-lapse video, and the second time control is used to indicate a playable duration of the time-lapse video.

12. The method according to claim 1, wherein the first preview image is an image collected based on a first frame rate and a first shooting parameter, and the first shooting parameter comprises a first photosensitivity ISO and a first exposure time parameter; and if the electronic device identifies that the shooting scenario is the low-light scenario, after the electronic device determines the target shooting parameter based on the shooting scenario and before the electronic device detects the third operation that the user indicates to start time-lapse video shooting, the method further comprises:

collecting, by the electronic device, a target image based on the target shooting parameter and a second frame rate, wherein the preview interface comprises a second preview image, and the second preview image is the target image, wherein the second frame rate is less than the first frame rate, the target photosensitivity ISO corresponding to the low-light scenario is less than the first photosensitivity ISO, and the target exposure time parameter corresponding to the low-light scenario is greater than the first exposure time parameter.

13. The method according to claim 1, wherein the preview interface further comprises a mode control, and the method further comprises:

detecting, by the electronic device, an operation that the user taps the mode control;

switching, by the electronic device, from an automatic mode to a manual mode; and displaying, by the electronic device, time-lapse parameter setting information on the preview interface in the manual mode.

14. The method according to claim 1, wherein after the obtaining, by the electronic device, the plurality of target photos through shooting based on the target shooting parameter, the method further comprises:

performing, by the electronic device, inter-frame brightness smoothing processing on the plurality of target photos.

15. The method according to claim 1, wherein the identifying, by the electronic device, the shooting scenario based on the first preview image comprises:

identifying, by the electronic device, the shooting scenario based on one or more of a first photosensitivity ISO, a first exposure time parameter, or a brightness distribution histogram corresponding to the first preview image.

16. An electronic device, comprising:
a camera: configured to collect an image;
a screen, configured to display an interface;
one or more processors; and
one or more memories, wherein the one or more memories store instructions; and
when the instructions are executed by the electronic device, the electronic device is enabled to perform:
after detecting a first operation that a user indicates to operate a camera function of the electronic device, start the camera function;
after detecting a second operation that the user indicates to enter a time-lapse mode, enter the time-lapse mode, and display a preview interface, wherein the preview interface comprises a first preview image that is collected based on a first frame rate and a first shooting parameter;
identify a shooting scenario based on the first preview image, wherein the shooting scenario comprises a high dynamic scenario, a low-light scenario, or a common scenario;
determine a target shooting parameter based on the shooting scenario, wherein the target shooting parameter comprises a target photosensitivity ISO and a target exposure time parameter;
after detecting a third operation that the user indicates to start shooting, obtain a plurality of target photos through shooting based on the target shooting parameter;
if the electronic device identifies that the shooting scenario is the high dynamic scenario or the common scenario, collecting, by the electronic device, a display image based on the first frame rate and the first shooting parameter;
display a shooting interface comprising the display image; and
after detecting a fourth operation that the user indicates to stop shooting, generate a time-lapse video based on the plurality of target photos.

17. The electronic device according to claim 16, wherein the electronic device is configured to:
display first prompt information on the preview interface, wherein the first prompt information is used to prompt the shooting scenario identified by the electronic device.

18. The electronic device according to claim 16, wherein the electronic device is configured to:
determine a target shooting interval based on a shot object on the first preview image, and
wherein the obtaining the plurality of target photos through shooting based on the target shooting parameter comprises:
obtaining, by the electronic device, the plurality of target photos through shooting based on the target shooting parameter and the target shooting interval.

19. The electronic device according to claim 18, wherein the target exposure time parameter comprises a plurality of target exposure time parameters, and
wherein the electronic device is further configured to:
obtain one group of multi-frame images with different exposure degrees through shooting based on the plurality of target exposure time parameters;
obtain a plurality of groups of images through shooting based on the target shooting interval; and
fuse each group of multi-frame images into one target photo.

20. A non-transitory computer-readable storage medium, comprising instructions, wherein when the instructions are run on an electronic device, the electronic device is enabled to perform operations comprising:
after detecting a first operation that a user indicates to operate a camera function of the electronic device, starting, by the electronic device, the camera function;
after detecting a second operation that the user indicates to enter a time-lapse mode, entering, by the electronic device, the time-lapse mode, and displaying a preview interface, wherein the preview interface comprises a first preview image that is collected based on a first frame rate and a first shooting parameter;
identifying, by the electronic device, a shooting scenario based on the first preview image, wherein the shooting scenario comprises a high dynamic scenario, a low-light scenario, or a common scenario;
determining, by the electronic device, a target shooting parameter based on the shooting scenario, wherein the target shooting parameter comprises a target photosensitivity ISO and a target exposure time parameter;
after detecting a third operation that the user indicates to start shooting, obtaining, by the electronic device, a plurality of target photos through shooting based on the target shooting parameter;
if the electronic device identifies that the shooting scenario is the high dynamic scenario or the common scenario, collecting, by the electronic device, a display image based on the first frame rate and the first shooting parameter;
displaying, by the electronic device, a shooting interface comprising the display image; and
after detecting a fourth operation that the user indicates to stop shooting, generating, by the electronic device, a time-lapse video based on the plurality of target photos.

* * * * *